(12) United States Patent
Jehan et al.

(10) Patent No.: US 12,032,620 B2
(45) Date of Patent: *Jul. 9, 2024

(54) IDENTIFYING MEDIA CONTENT

(71) Applicant: Spotify AB, Stockholm (SE)

(72) Inventors: Tristan Jehan, Brooklyn, NY (US); Nicola Montecchio, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,703

(22) Filed: Mar. 22, 2021

(65) Prior Publication Data

US 2021/0303612 A1    Sep. 30, 2021

Related U.S. Application Data

(63) Continuation of application No. 15/617,884, filed on Jun. 8, 2017, now Pat. No. 10,984,035.

(Continued)

(51) Int. Cl.
*G06F 16/435* (2019.01)
*G06N 20/00* (2019.01)
(Continued)

(52) U.S. Cl.
CPC ...... *G06F 16/435* (2019.01); *G06F 16/24578* (2019.01); *G06F 16/63* (2019.01);
(Continued)

(58) Field of Classification Search
CPC ......... G06F 16/435; G06F 16/24; G06F 16/63
See application file for complete search history.

(56) References Cited

U.S. PATENT DOCUMENTS

| 8,101,843 B2 | 1/2012 | Turner |
| 8,254,829 B1 | 8/2012 | Kindred et al. |

(Continued)

FOREIGN PATENT DOCUMENTS

| EP | 1 705 588 A1 | 9/2006 |
| EP | 1821309 A1 | 8/2007 |

(Continued)

OTHER PUBLICATIONS

U.S. Appl. No. 14/883,336, filed Oct. 14, 2015 for "Selection and Playback of Song Versions Using Cadence".

(Continued)

*Primary Examiner* — Maher N Algibhah
(74) *Attorney, Agent, or Firm* — Merchant & Gould P.C.

(57) ABSTRACT

Systems, devices, and methods for identifying media content using indirect qualities are provided. An example media-delivery system includes a content identification engine that applies a model associated with an indirect quality to media content items to generate indirect quality scores for the media content items, filters the media content items based on metadata associated with the media content items to generate filtered media content items, and presents at least some of the filtered media content items based on the indirect quality scores. An example media-playback device includes a search control engine that presents a search interface with a user-actuatable control for specifying a value of an indirect quality for use as a search criteria, transmits the search criteria to a media-delivery service, and receives media content items matching the search criteria from the media-delivery service, wherein the media content items are identified using a statistical model.

20 Claims, 17 Drawing Sheets

Related U.S. Application Data

(60) Provisional application No. 62/347,642, filed on Jun. 9, 2016.

(51) Int. Cl.
    *G06F 16/9535* (2019.01)
    *G06F 16/2457* (2019.01)
    *G06Q 30/02* (2023.01)
    *G06F 16/9538* (2019.01)
    *G06F 16/63* (2019.01)

(52) U.S. Cl.
    CPC ...... *G06F 16/9535* (2019.01); *G06F 16/9538* (2019.01); *G06N 20/00* (2019.01); *G06Q 30/02* (2013.01)

(56) References Cited

U.S. PATENT DOCUMENTS

| | | | |
|---|---|---|---|
| 8,626,607 | B1 | 1/2014 | Wood et al. |
| 8,688,716 | B1 | 4/2014 | DuHadway et al. |
| 8,704,068 | B2 | 4/2014 | Bowen |
| 9,361,353 | B1 | 6/2016 | Aristides |
| 9,503,500 | B2 | 11/2016 | Bernhardsson et al. |
| 9,788,777 | B1 | 10/2017 | Knight et al. |
| 10,114,607 | B1 | 10/2018 | Riggs-Zeigen |
| 10,372,757 | B2 | 8/2019 | Jehan |
| 10,984,035 | B2 | 4/2021 | Jehan |
| 11,048,748 | B2 | 6/2021 | Jehan |
| 11,113,346 | B2 | 9/2021 | Jehan |
| 2003/0205124 | A1 | 11/2003 | Foote et al. |
| 2005/0020223 | A1 | 1/2005 | Ellis et al. |
| 2005/0211072 | A1 | 9/2005 | Lu et al. |
| 2005/0223879 | A1 | 10/2005 | Huffman |
| 2006/0080356 | A1 | 4/2006 | Burges et al. |
| 2006/0107822 | A1 | 5/2006 | Bowen |
| 2006/0195462 | A1 | 8/2006 | Rogers |
| 2006/0230065 | A1 | 10/2006 | Plastina et al. |
| 2006/0243120 | A1 | 11/2006 | Takai et al. |
| 2006/0276919 | A1 | 12/2006 | Shirai et al. |
| 2007/0044641 | A1 | 3/2007 | McKinney et al. |
| 2007/0074617 | A1 | 4/2007 | Vergo |
| 2007/0074618 | A1 | 4/2007 | Vergo |
| 2007/0074619 | A1 | 4/2007 | Vergo |
| 2007/0079691 | A1 | 4/2007 | Turner |
| 2007/0118043 | A1 | 5/2007 | Oliver et al. |
| 2007/0174274 | A1 | 7/2007 | Kim |
| 2007/0203421 | A1 | 8/2007 | Cho et al. |
| 2007/0204744 | A1 | 9/2007 | Sako et al. |
| 2007/0261538 | A1 | 11/2007 | Takai et al. |
| 2007/0266843 | A1* | 11/2007 | Schneider ............ G10H 1/0033 84/612 |
| 2008/0018625 | A1 | 1/2008 | Ijichi et al. |
| 2008/0072740 | A1 | 3/2008 | Horii et al. |
| 2008/0072741 | A1 | 3/2008 | Ellis |
| 2008/0096726 | A1 | 4/2008 | Riley et al. |
| 2008/0147711 | A1 | 6/2008 | Spiegelman et al. |
| 2008/0147742 | A1* | 6/2008 | Allen ................... G06F 16/951 |
| 2008/0153671 | A1 | 6/2008 | Ogg et al. |
| 2008/0256106 | A1* | 10/2008 | Whitman ................. G06F 16/68 |
| 2009/0025539 | A1 | 1/2009 | Sagoo et al. |
| 2009/0044687 | A1 | 2/2009 | Sorber |
| 2009/0217804 | A1 | 9/2009 | Lu et al. |
| 2010/0145892 | A1 | 6/2010 | Yang et al. |
| 2010/0168879 | A1 | 7/2010 | Takatsuka et al. |
| 2011/0015765 | A1 | 1/2011 | Haughay |
| 2011/0093100 | A1 | 4/2011 | Ramsay |
| 2011/0154198 | A1 | 6/2011 | Bachman et al. |
| 2012/0254907 | A1 | 10/2012 | Serdiuk |
| 2012/0331386 | A1 | 12/2012 | Hicken |
| 2013/0091167 | A1 | 4/2013 | Bertin-Mahieux et al. |
| 2013/0191088 | A1 | 7/2013 | Wells |
| 2013/0228063 | A1 | 9/2013 | Turner |
| 2013/0339343 | A1 | 12/2013 | Hierons |
| 2014/0052731 | A1 | 2/2014 | Dahule |
| 2014/0270375 | A1 | 9/2014 | Canavan et al. |
| 2014/0277648 | A1 | 9/2014 | Chong et al. |
| 2014/0307878 | A1 | 10/2014 | Osborne et al. |
| 2015/0032657 | A1 | 1/2015 | Huehn |
| 2015/0081066 | A1 | 3/2015 | Yeh et al. |
| 2015/0142147 | A1 | 5/2015 | Stanghed et al. |
| 2016/0004744 | A1 | 1/2016 | Eriksson |
| 2016/0055420 | A1 | 2/2016 | Karanam |
| 2016/0086089 | A1* | 3/2016 | Ritchie .................... G06N 7/00 706/11 |
| 2016/0092559 | A1 | 3/2016 | Lind |
| 2016/0292270 | A1 | 10/2016 | Negi |
| 2016/0346604 | A1 | 12/2016 | Lindstrom |
| 2017/0193097 | A1 | 7/2017 | Cramer |
| 2017/0195700 | A1 | 7/2017 | Jin et al. |
| 2017/0337033 | A1 | 11/2017 | Duyan |

FOREIGN PATENT DOCUMENTS

| | | |
|---|---|---|
| WO | 2006/072961 A2 | 7/2006 |
| WO | 2014/096832 A1 | 6/2014 |

OTHER PUBLICATIONS

U.S. Appl. No. 14/883,252, filed Oct. 14, 2015 for "Repetitive Motion Activity Enhancement Based Upon Media Content Selection".
U.S. Appl. No. 14/883,245, filed Oct. 14, 2015 for "Heart Rate Control Based Upon Media Content Selection".
U.S. Appl. No. 14/883,232, filed Oct. 14, 2015 for "Cadence Determination and Media Content Selection".
U.S. Appl. No. 14/883,298, filed Oct. 14, 2015 for "Cadence-Based Playlists Management System".
U.S. Appl. No. 14/883,273, filed Oct. 14, 2015 for "Multi-Track Playback of Media Content During Repetitive Motion Activities".
U.S. Appl. No. 14/883,295, filed Oct. 14, 2015 for "Search Media Content Based Upon Tempo".
U.S. Appl. No. 14/883,318, filed Oct. 14, 2015 for "Cadence and Media Content Phase Alignment".
U.S. Appl. No. 14/944,972, filed Nov. 18, 2015 for "System for Managing Transitions Between Media Content Items".
U.S. Appl. No. 14/883,340, filed Oct. 14, 2015 for "Cadence-Based Selection, Playback, and Transition Between Song Versions".
U.S. Appl. No. 14/883,323, filed Oct. 14, 2015 for "Accessibility Management System for Media Content Items".
The Echonest, "Analyzer Documentation", Version 3.2, Jan. 7, 2014, 7 pages.
Extended European Search Report for European Patent Application No. 16169963.2, dated Oct. 21, 2016, 9 pages.
U.S. Appl. No. 14/945,008, filed Nov. 18, 2015 for "Identifying Media Content".
International Search Report and Written Opinion from International Patent Application No. PCT/US2017/036575, dated Jul. 17, 2017.
International Search Report and Written Opinion from International Patent Application No. PCT/US2017/036571, dated Aug. 4, 2017.
Geoffray Bonnin et al: "Automated Generation of Music Playlists: Survey and Experiments", ACM Computing Surveys., vol. 47, No. 2, Nov. 12, 2014 (Nov. 12, 2014), pp. 1-35.
Summons to Attend Oral Proceedings from the European Patent Office for European Application No. 16169963.2, dated Oct. 31, 2017, 10 pages.
PCT International Preliminary Report on Patentability in Application PCT/US2017/036575, dated Dec. 20, 2018, 8 pages.
PCT International Preliminary Report on Patentability in Application PCT/US2017/036571, dated Dec. 20, 2018, 9 pages.

* cited by examiner

IDENTIFYING MEDIA CONTENT

CROSS-REFERENCE TO RELATED APPLICATION

This application is a continuation of U.S. application Ser. No. 15/617,884, filed 8 Jun. 2017, entitled IDENTIFYING MEDIA CONTENT, which claims priority to U.S. Application No. 62/347,642, filed on 9 Jun. 2016, entitled IDENTIFYING MEDIA CONTENT, the disclosures of which are hereby incorporated by reference in their entireties. To the extent appropriate a claim of priority is made to each of the above-disclosed applications.

BACKGROUND

Many people enjoy consuming media content, such as listening to audio content or watching video content. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her media-playback device.

This nearly limitless access to media content introduces new challenges for users. For example, it may be difficult to find or select the right media content that complements a particular moment, activity, environment, or purpose.

SUMMARY

In general terms, this disclosure is directed to identifying media content having qualities that are determined indirectly. In one possible configuration and by non-limiting example, a media-delivery system analyzes media content items to generate a score that is indicative of one or more indirect qualities of the media content item. Various aspects are described in this disclosure, which include, but are not limited to, the following aspects.

In one aspect, a media-playback device comprising: a media-output device that plays media content items; and a search control engine configured to: present a search interface comprising at least one user-actuatable control for specifying a value of an indirect quality for use as a search criteria; transmit the search criteria to a media-delivery service; and receive media content items matching the search criteria from the media-delivery service, wherein the media content items are identified using a statistical model.

In another aspect, a media-delivery system comprising: a processing device; a media data store for storing a plurality of media content items; and a content identification engine executable by the processor to: apply a model associated with an indirect quality to a plurality of media content items to generate indirect quality scores for the media content items; filter the plurality of media content items based on metadata associated with media content items to generate a plurality of filtered media content items; and present at least a portion of the plurality of filtered media content items, wherein the portion of the plurality of filtered media content items presented are selected based on the indirect quality scores.

In yet another aspect, a method for presenting media content items to a user based on an indirect quality: acquiring, using a computing device, training examples of media content items for the indirect quality; building a model using the training examples; evaluating media content items using the model; filtering the evaluated media content items; and presenting the filtered media content items.

DETAILED DESCRIPTION

Figure 1:
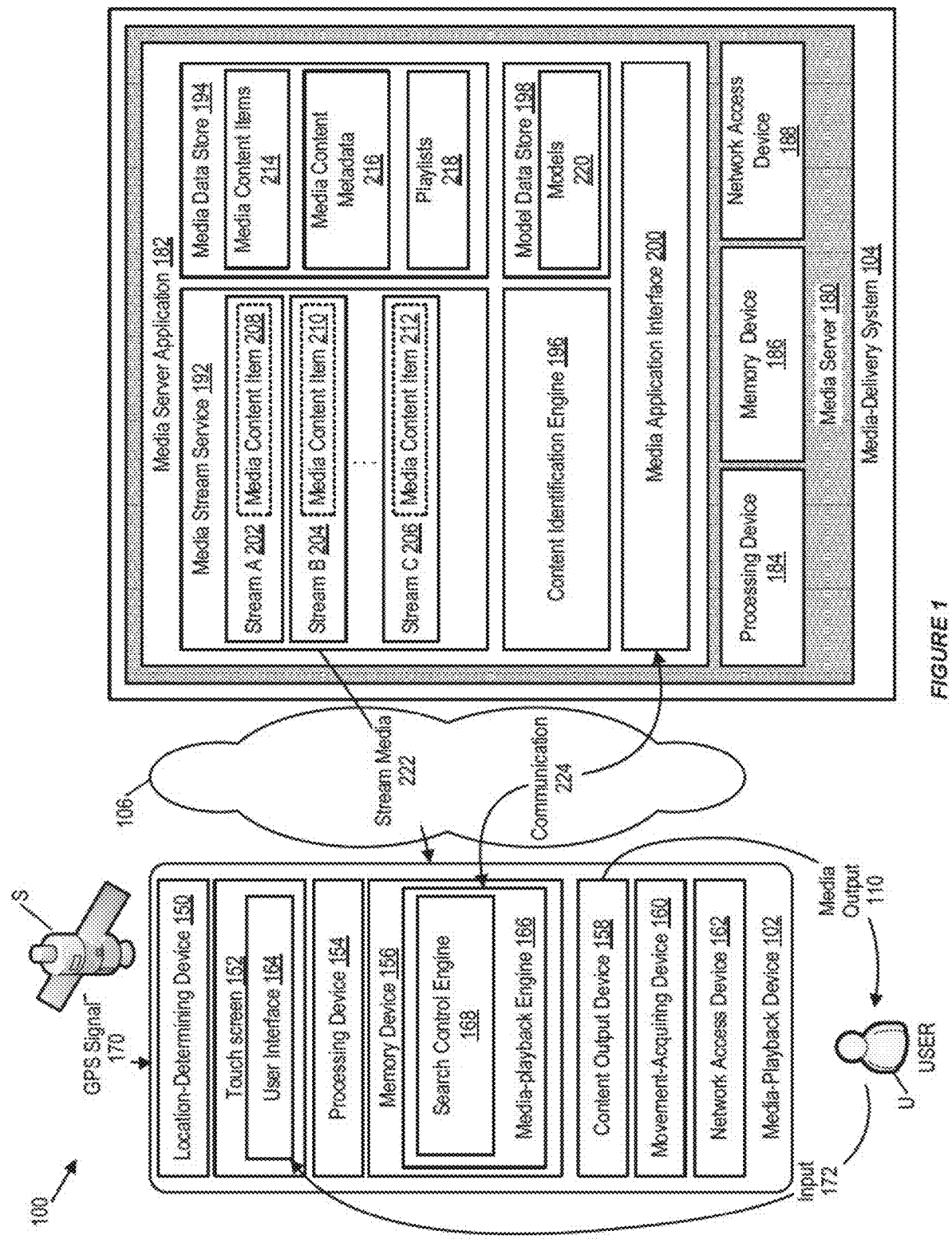
FIG. 1 is a schematic illustration of an example system for media content selection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, such as dancing and repetitive-motion activities. Examples of repetitive-motion activities include swimming, biking, running, rowing, and other activities. Consuming media content may include one or more of listening to audio content, watching video content, or consuming other types of media content. For ease of explanation, the embodiments described in this application are presented using specific examples. For example, listening to audio content (and in particular music) is described as an example of one form of media consumption. However, it should be understood that the same concepts described herein are equally applicable to other forms of media consumption, and at least some embodiments include other forms of media consumption.

While media content may be composed of various qualities that can be directly measured (e.g., tempo, onsets, durations, pitches, etc.), the media content also includes various indirect qualities. An indirect quality may be a quality that cannot be directly measured from the media content (e.g., not detectable from the structure of music in the media content item, its score representation, or its transcription). For example, some media content may induce a particular emotional response in a person listening to or watching the media content. Typically, whether a media content item will induce a particular emotional response cannot be measured directly from data representing the media content (e.g., audio signal, video signal, etc.). Additionally, indirect qualities may lack a unit of measurement. In contrast, many qualities that can be measured directly are associated with units of measurement (e.g., seconds for duration, hertz for pitch, beats per minute for tempo, etc.).

Indirect qualities may be subjective or objective. Examples of subjective qualities include the intensity or energy of a media content item, the valence or positiveness conveyed by the media content item, and the suitability of a media content item for an activity such as dancing or running. Other indirect qualities, however, are reasonably objective. Examples of objective indirect qualities includes whether a media content item was recorded live, whether it was exclusively recorded with acoustic instruments, whether it is exclusively instrumental; whether the vocals are spoken words. Together with subjective attributes, they share the quality of being acoustically predictable.

Although indirect qualities may not be directly measurable and in some cases may be subjective, the indirect qualities may nevertheless be perceived fairly consistently by different people. In some embodiments, a system predicts at least one indirect quality for a media content item from data such as an audio or video recording. Predicting an indirect quality may include generating a score corresponding to the likelihood that the media content item associated with the score would be perceived as having the indirect quality by a listener, viewer, etc. The score may be a numeric value or a Boolean value. The predictions may be generated using a model derived from supervised learning techniques.

Some non-limiting examples of indirect qualities include danceability, energy, speechiness, liveness, acousticness, valence, and instrumentalness. In some embodiments, a danceability score describes how suitable a media content item is for dancing. In some embodiments, the danceability score is based on a combination of some or all of the following: tempo, rhythm stability, beat strength, and overall regularity.

In some embodiments, an energy score represents a perceptual measure of intensity and powerful activity released throughout the media content item. In some embodiments, media content items that have a high energy score are perceived as fast, loud, and noisy. For example, music from the genre death metal may have a higher energy score, while a Bach prelude has a lower energy score. In some embodiments, the energy score is based on a combination of some or all of the following: dynamic range, perceived loudness, timbre, onset rate, and general entropy.

In some embodiments, a speechiness score represents the presence of spoken words in a track. The more exclusively speech-like the media content item (e.g. talk show, audio book, poetry), the higher the speechiness score. Some embodiments use a range of scores between 0-1.0 for speechiness, where values above 0.66 describe media content items that are probably made entirely of spoken words, values between 0.33 and 0.66 describe media content items that may contain both music and speech (either in sections or layered, including, e.g., rap music), and values below 0.33 most likely represent music and other non-speech-like media content items.

In some embodiments, a liveness score represents the presence of an audience in the media content item. The more likely a media content item is live, the higher the liveness score. Some embodiments use a range of scores between 0-1.0 for liveness, where a score above 0.8 indicates the media content item is highly likely to include a live recording, values between 0.6 and 0.8 represent media content items that may include live or simulated audience sounds (e.g., at the beginning or end of the media content item), and values below 0.6 most likely represent studio recordings. Because some embodiments include a relatively small population of live media content items in the overall domain of media content items, the threshold for determining that a media content item is live may be higher than the thresholds for other indirect qualities.

In some embodiments, an acousticness score represents the likelihood a media content item includes a recording that was created by solely acoustic means such as voice and acoustic instruments as opposed to electronically such as with synthesized, amplified, or effected instruments. For example, media content items with lower acousticness scores may include electric guitars, distortion, synthesizers, auto-tuned vocals, and drum machines, whereas songs with higher acousticness scores may include orchestral instruments, acoustic guitars, unaltered voices, and natural drum kits.

In some embodiments, a valence score represents the musical positivity conveyed by a media content item. Media content items with higher valence scores may be perceived as more positive (e.g., happy, cheerful, euphoric), while tracks with lower valence scores may be perceived as more negative (e.g., sad, depressed, angry). In some embodiments, the valence score is evaluated in combination with the energy score to indicate an acoustic mood of the media content item (e.g., the general emotional qualities that are likely to be perceived during playback of the media content item). Note that in the case of vocal music, lyrics may differ semantically from the perceived acoustic mood as indicated by one or more of the valence score and the energy score.

In some embodiments, the instrumentalness score represent the likelihood a media content item contains only recordings of instruments (e.g., no vocal recordings). Media content items featuring the human voice, more particularly lyrics, even with instruments, will have a lower instrumentalness score. In contrast, media content items with only instruments may have a higher instrumentalness score.

FIG. 1 is a schematic illustration of an example system 100 for media content selection. The system 100 includes a media-playback device 102 and a media-delivery system 104. Also shown in FIG. 1, are a network 106, a user U, and a satellite S.

The media-playback device 102 operates to play media content items. In some embodiments, the media-playback device 102 operates to play media content items that are provided (e.g., streamed, transmitted, etc.) by a system external to the media-playback device 102 such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by a system external to the media-playback device 102.

The media-playback device 102 operates to play media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, BLU-RAY DISC or DVD player, media player, stereo, or radio.

In at least some embodiments, the media-playback device 102 includes a location-determining device 150, a touch screen 152, a processing device 154, a memory device 156, a content output device 158, a movement-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150, the touch screen 152, and the movement-acquiring device 160.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises at least one central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a search control engine 168. In some embodiments, the media-playback engine 166 operates to playback media content and the search control engine 168 operates to identify or retrieve media content for playback based on various conditions. Additional details regarding the search control engine 168 are provided below.

The memory device 156 typically includes at least some form of computer-readable media. Computer-readable media includes any available media that can be accessed by the media-playback device 102. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, BLU-RAY DISCS, digital versatile discs or other optical storage, magnetic cassettes, magnetic tape, magnetic disk storage or other magnetic storage devices, or any other medium that can be used to store the desired information and that can be accessed by the media-playback device 102. In some embodiments, the computer-readable storage media comprises non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The content output device 158 operates to output media content. In some embodiments, the content output device 158 generates media output 110 for the user U. Examples of the content output device 158 include a speaker, an audio output jack, a BLUETOOTH transmitter, a display panel, and a video output jack. Other embodiments are possible as well. For example, the content output device 158 may transmit a signal through the audio output jack or BLUETOOTH transmitter that can be used to reproduce an audio signal by a connected or paired device such as headphones or a speaker.

The movement-acquiring device 160 operates to acquire movement data associated with movements of the user U. Examples of movement data include a direction of the movement, an intensity of the movement, a cadence (e.g., frequency) of the movement, and a regularity of the movement. In at least some embodiments, the movement-acquiring device 160 operates to determine movement directly and includes one or more accelerometers or other motion-detecting technologies. Alternatively, the movement-acquiring device 160 operates to receive data representing a movement associated with the user U. For example, in some embodiments, the movement-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring movement. Further, in some embodiments, the movement-acquiring device 160 operates to receive movement data input by the user U or another person such as through a user interface or user-actuatable control.

The network access device 162 operates to communicate with other computing devices over one or more networks, such as the network 106. Examples of the network access device include wired network interfaces and wireless network interfaces. Wireless network interfaces includes infrared, BLUETOOTH wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH, ultra-wideband (UWB), 802.11/b/g/n/ac, ZIGBEE, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180. In at least some embodiments, the media server 180 is provided by multiple computing devices. For example, the media server 180 may be provided by multiple redundant servers located in multiple geographic locations. As an additional example, the various functions of the media server 180 may be provided by multiple heterogeneous servers.

The media server 180 operates to transmit stream media 222 to media-playback devices such as the media-playback device 102. In some embodiments, the media server 180 includes a media server application 182, a processing device 184, a memory device 186, and a network access device 188. The processing device 184, the memory device 186, and the network access device 188 may be similar to the processing device 154, the memory device 156, and the network access device 162 respectively, which have each been previously described.

In some embodiments, the media server application 182 operates to stream music or other audio, video, or other forms of media content. The media server application 182 includes a media stream service 192, a media data store 194, a content identification engine 196, a model data store 198, and a media application interface 200.

In some embodiments, multiple servers provide various components of the media server application 182. For example, in some embodiments, separate heterogeneous servers operate to provide each of the media stream service 192, the media data store 194, the content identification engine 196, the model data store 198, and the media application interface 200.

The media stream service 192 operates to buffer media content such as media content items 208, 210, and 212 for streaming to one or more streams 202, 204, and 206.

In some embodiments, the media data store 194 stores media content items 214, media content metadata 216, and playlists 218. The media data store 194 may comprise one or more databases and file systems. Other embodiments are possible as well. As noted above, the media content items 214 may be audio, video, or any other type of media content, which may be stored in any format for storing media content.

The media content metadata 216 operates to provide various information associated with the media content items 214. In some embodiments, the media content metadata 216 includes one or more of title, artist name, album name, length, genre, mood, era, etc. The playlists 218 operate to identify one or more of the media content items 214 and. In some embodiments, the playlists 218 identify a group of the media content items 214 in a particular order. In other embodiments, the playlists 218 merely identify a group of the media content items 214 without specifying a particular order. Some, but not necessarily all, of the media content items 214 included in a particular one of the playlists 218 are associated with a common characteristic such as a common genre, mood, or era.

The content identification engine 196 operates to identify media content items that have or are likely to have various indirect qualities. In some embodiments, the content identification engine 196 may provide a list of media content items that have been identified for a particular indirect quality in response to a request that identifies that indirect quality. Further, in some embodiments, the media content items included in the returned list are further identified based on additional attributes such as genre, tempo, etc. Aspects of the content identification engine 196 is illustrated and described with respect to at least FIGS. 2-17.

In some embodiments, the model data store 198 stores models 220 that are usable by the content identification engine 196. In some embodiments, the models 220 are generated by the content identification engine 196. Additionally, in some embodiments, the models 220 may be generated elsewhere and are transmitted to the media-delivery system 104 for storage in the model data store 198 and use by the content identification engine 196. The model data store 198 may comprise one or more databases and file systems. Other embodiments are possible as well. Additionally, in some embodiments, the models 220 are stored in the media data store 194.

The media application interface 200 can receive requests or other communication from media-playback devices or other systems, to retrieve media content items from the media server 180. For example, in FIG. 1, the media application interface 200 receives communication 224 from the media-playback engine 166.

Each of the media-playback device 102 and the media-delivery system 104 can include additional physical computer or hardware resources. In at least some embodiments, the media-playback device 102 communicates with the media-delivery system 104 via the network 106.

Although in FIG. 1 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 1 illustrates a streaming media based system for cadence determination and media content selection, other embodiments are possible as well. For example, in some embodiments, the media-playback device 102 includes a media data store 194 and the media-playback device 102 is configured to perform media content selection without accessing the media-delivery system 104. Further, in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a request from the user U to retrieve or playback media content items that are identified as having a specified indirect quality. In accordance with an embodiment, the user U can direct the input 172 to the user interface 164 to issue such requests. Further in some embodiments, the media-playback device 102 uses information captured by the movement-acquiring device 160 to determine an indirect quality of content items to be requested. Additionally, information from the movement-acquiring device 160 can also be used to further identify content media items that are suitable for the user based on an activity or cadence associated with an activity that is indicated by the movement-acquiring device 160.

Figure 2:
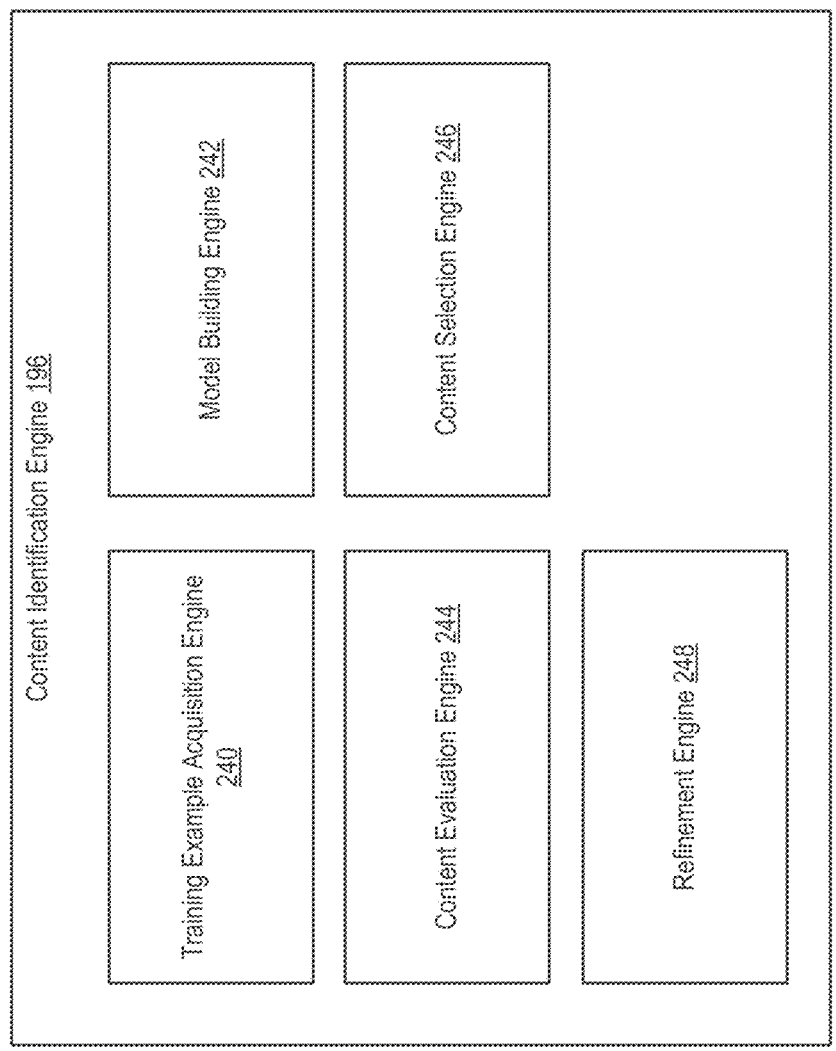
FIG. 2 is a schematic block diagram of the content identification engine of FIG. 1.

FIG. 2 is a schematic block diagram of the content identification engine 196. In some embodiments, the content identification engine 196 includes a training example acquisition engine 240, a model building engine 242, a content evaluation engine 244, a content selection engine 246, and a refinement engine 248.

The training example acquisition engine 240 operates to acquire training examples of media content items having a particular indirect quality that can be used to train a model to identify the indirect quality. In some embodiments, the training examples are labeled as having or not having particular indirect qualities. In some embodiments, the label is a Boolean indicator that indicates that the media content item does or does not have a particular indirect quality. Additionally, in some embodiments, the label includes a score or value, such as a numeric value, that corresponds to how strongly the media content item embodies the particular indirect quality. In some embodiments, the training examples (or information that identifies the training examples) are stored in the model data store 198. Example methods performed by some embodiments of the training example acquisition engine 240 are illustrated and described with respect to at least FIG. 4.

In some embodiments, the training example acquisition engine 240 comprises a playlist analysis engine that operates to analyze playlists to identify media content items that users have identified as having a particular indirect quality (e.g., media content items that are identified as being good for running or dancing, or as being "high energy"). Example methods performed by some embodiments of the training example acquisition engine 240 are illustrated and described with respect to at least FIGS. 4 and 11.

The model building engine 242 operates to build one or more models that can be used to identify media content items that are likely to have a particular indirect quality. In various embodiments, the model building engine 242 uses one or more machine learning techniques to build the models. In some embodiments, the models are built using training examples that have been acquired by the training example acquisition engine 240. As an example, the models may be usable to determine how similar or dissimilar a media content item is to at least some of the training examples. Example methods performed by some embodiments of the model building engine 242 are illustrated and described with respect to at least FIGS. 12 and 13.

The content evaluation engine 244 operates to evaluate media content items to determine whether the media content items comprise a particular indirect quality. In some embodiments, a media content item comprises a particular indirect quality if it is likely that the playback of the media content item is likely to enhance a user's performance or enjoyment of an activity, or if it is likely to enhance a particular mood or environment. In some embodiments, the content evaluation engine 244 uses models generated by the model building engine 242. Additionally, in some embodiments, the content evaluation engine 244 generates scores for media content items based on the indirect qualities. Example methods performed by some embodiments of the content evaluation engine 244 are illustrated and described with respect to at least FIG. 15.

The content selection engine 246 operates to select media content items for playback based on a specified indirect quality. For example, in some embodiments, the content selection engine 246 operates to select media content items for playback during a particular activity (e.g., dancing, running, celebrating, relaxing, going to sleep, waking up, etc.) or to create or enhance an environment or mood. Additionally, some embodiments of the content selection engine 246 operate to select media content items based on a combination of indirect qualities as well as other factors. In at least some embodiments, the content selection engine 246 filters media content items based on one or more characteristics including but not limited to scores generated by the content evaluation engine 244. Example methods performed by some embodiments of the content selection engine 246 are illustrated and described with respect to at least FIG. 16.

The refinement engine 248 operates to refine the operations of the content identification engine 196. For example, in some embodiments, the refinement engine 248 operates to cause the model building engine 242 to update or modify one or models. As an example, some embodiments include a content playback analysis engine that operates to analyze the playback (or use) of media content items by users. In some embodiments, the content playback analysis engine identifies media content items that are frequently played back or skipped during an activity or after a request for content media items having a particular indirect quality. Additionally, in some embodiments, the content playback analysis engine uses one or more metrics related to an activity associated with the indirect quality such as performance metrics, physiological metrics, and enhancement metrics. Examples of performance metrics include speed and cadence when the activity is, for example, running, cycling, etc. Example physiological metrics include physiological measurements such as heart rate. Examples of enhancement metrics include alignment of cadence associated with the activity to the beat of the media content, amount of movement (e.g., when danceable music is provided), etc. Other metrics that are analyzed by some embodiments include whether a user indicated liking a media content item (e.g., by actuating a like control during playback or at a later time such as during a playlist review after completion of playback), whether the user added the media content item to a playlist, etc. Example methods performed by some embodiments of the refinement engine 248 are illustrated and described with respect to at least FIG. 17.

Figure 3:
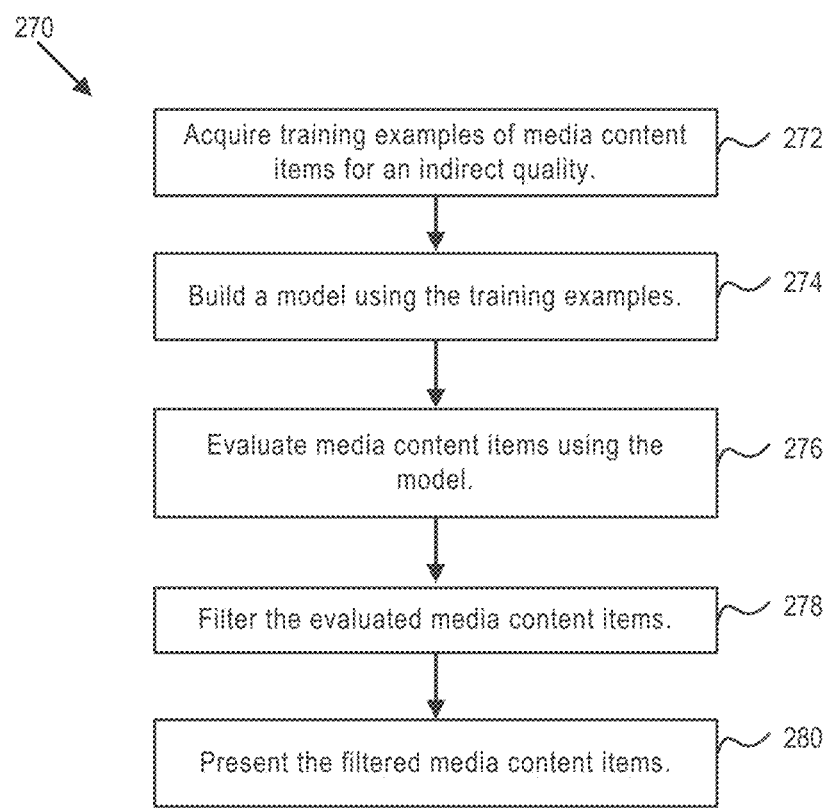
FIG. 3 illustrates an example method of identifying media content for playback base on a desired purpose, interest, environment, or activity performed by some embodiments of the system of FIG. 1.

FIG. 3 illustrates an example method 270 of identifying media content for playback base on a desired purpose, interest, environment, or activity performed by some embodiments of the content identification engine 196. Such a method can be used, for example, when the user is engaging in a particular activity or desiring music to enhance a particular environment or mood.

At operation 272, training examples for an indirect quality is acquired. In some embodiments, acquiring the training examples comprises acquiring files containing the training examples. Additionally, in some embodiments, acquiring the training examples comprises acquiring one or more lists of information that identifies a location (e.g., the media data store 194) of files containing the training examples. In at least some embodiments, the training examples include positive training examples that have been identified as having the indirect quality. Additionally, the training examples may include negative training examples that have been identified as not having the indirect quality.

In some embodiments, positive training examples are acquired by analyzing playlists (e.g., playlists generated by users) to identify media content items that are included in playlists related to the indirect quality. Negative training examples may be acquired in a similar manner by analyzing playlists to identify media content items included in playlists that are unrelated to the indirect quality. Additionally or alternatively, training examples are acquired by analyzing titles or other metadata associated with the media content items; analyzing comments about the media content items on social media, or other websites or platforms. Training examples may be acquired by other methods as well such as by receiving user input via a user interface presented to a user about whether a media content item is associated with an indirect quality. Example user interfaces and methods for receiving user input about media content items are described and illustrated with respect to at least FIGS. 9 and 10.

At operation 274, a model is built using the training examples. In various embodiments, the model is built using one or more machine learning techniques. The model may, for example, operate to determine how similar a media content item is to the positive training examples. Additionally, the model may operate to classify a media content item as being more like the positive training examples than the negative training examples or vice-versa. In some embodiments, the model is built based on audio analysis of the media content items. Additionally, in some embodiments, the model is built based on metadata associated with the media content items. Once generated, the models may be stored in the model data store 198 for later use to evaluate media content items. Various methods for building a model are illustrated and described with respect to at least FIGS. 12 and 13.

At operation 276, media content items are evaluated using the model generated in operation 274. In some embodiments, some or all of the media content items stored in the media data store 194 are evaluated. Some embodiments evaluate a subset of the media content items based on a characteristic such as a genre, era, popularity, tempo, etc. In some embodiments, a score related to the indirect quality is generated for at least some of the evaluated media content items. In some embodiments, the score is a value that corresponds to how similar a media content item is to the positive training examples as calculated using the model. In some embodiments, the score is a numerical value in the range of 0-1 in which higher values indicate the media content item is more similar to the positive training examples than lower values. Further in some embodiments, numerical scores are normalized across a set of media content items so that an approximately equal quantity of media content items are found in each equal sized score range. Some embodiments store the scores in the media data store 194.

At operation 278, the evaluated media content items are filtered. The media content items may be filtered based on a variety of characteristics, including a score threshold for the one or more scores for indirect qualities. Additionally, in some embodiments, the evaluated media content items are filtered based on genre, artist name, song title, other search parameters, or other criteria. In some embodiments, the media content items are also filtered based on a tempo range, which may be associated with the cadence of an activity the user is currently engaging in (e.g., running). Additionally, some embodiments operate to filter media content items based on analysis of audio signals associated with the media content item. For example, media content items that include a variable tempo may be excluded. As another example, media content items having quiet or low-energy portions with a duration greater than a predetermined threshold are excluded. However, in some embodiments if the quiet or low-energy portion is near the beginning or end of the media content item, the media content item is not excluded. Instead, the quiet or low-energy portion may be excluded using mix-in or mix-out points. Examples of calculating and using mix-out and mix-in points are provided in U.S. Patent Application Ser. Nos. 62/163,865 and 14/944,972, titled SYSTEM FOR MANAGING TRANSITIONS BETWEEN MEDIA CONTENT ITEMS, filed on May 19, 2015 and Nov. 18, 2015, respectively, the entireties of which are hereby incorporated by reference.

In some embodiments, the media content items that pass all of the filters are identified as runnable and a runnable flag (e.g., a Boolean value field) in the repetitive-motion activity metadata associated with the media content item. Alternatively, the runnability score of media content items that do not pass the filters may be adjusted (e.g., lowered or set to zero).

At operation 280, the filtered media content items are presented. In some embodiments, the filtered media content items are presented by transmitting a list identifying the media content items to the media-playback device 102. The media-playback device 102 may then present the media content items to a user via the user interface 164. Alternatively, the media-playback device 102 may present the media content items to a user by starting playback of the media content items.

In various embodiments, the method 270 is used for various purposes. For example, the method 270 may be used to recommend media content items to a user by identifying media content items that have similar indirect qualities to media content items the user is known to like. For example, a taste profile may be developed for a user based on the media content items the user is known to like (e.g., based on express indication of liking the media content items, number of times the media content item has been played back, etc.). As another example, the method 270 may be used to expressly search for media content items matching one or more particular indirect qualities. The media-playback device 102 may generate a user interface which includes user-actuatable controls associated with one or more indirect qualities to enable a user to specify indirect qualities to search for in media content items. An example user interface for searching by indirect quality is illustrated and described with respect to at least FIG. 6.

Additionally, the method 270 may be used to identify media content items that are similar to a particular media content item. For example, some embodiments present a user interface which includes a list of similar media content items. The similar media content items may be identified based on having shared or similar indirect qualities, other qualities of the data (or recording), or other characteristic such as a genre, era, popularity, etc. An example user interface for presenting similar media content items based on an indirect quality is illustrated and described with respect to at least FIG. 7.

Another example use of the method 270 is to classify media content items based on indirect qualities. For example, media content items from a particular artist may be divided between live and studio based on indirect qualities. In some embodiments, a user interface on the media-playback device 102 operates to displays separate groups of media content items in accordance with a classification based on indirect qualities. An example user interface for presenting media content items that have been classified based on an indirect quality is illustrated and described with respect to at least FIG. 7.

Additionally, in some embodiments, the method 270 is used to aid in generating playlists. The indirect qualities identified by the method 270 may be used to select or suggest media content items for inclusion in a playlist. For example, media content items that have scored high on the indirect quality of being danceable may be suggested for including on a dancing playlist. Further, in some embodiments, during generation of a dancing playlist, only media content items that have scored high on the indirect quality of being danceable are presented in search results. An example user interface for presenting for inclusion in a playlist media content items based on an indirect quality is illustrated and described with respect to at least FIG. 8.

Although the method 270 has been described sequentially, in some embodiments the operations of method 270 are performed in different orders or include different operations. Additionally, in some embodiments, the operations of method 270 may be performed at different times or repeated independent of each other. For example, in some embodiments, operations 272 and 274 are repeated on a regular schedule (e.g., weekly, monthly, annually, etc.) to generate or update a list of training examples and a model built from that list. While operations 276 and 278, on the other hand, are performed once initially on all media content items in the media data store 194 and are then repeated on new media content items as those new media content items are added to the media data store 194. Additionally, some embodiments do not perform operation 278.

Figure 4:
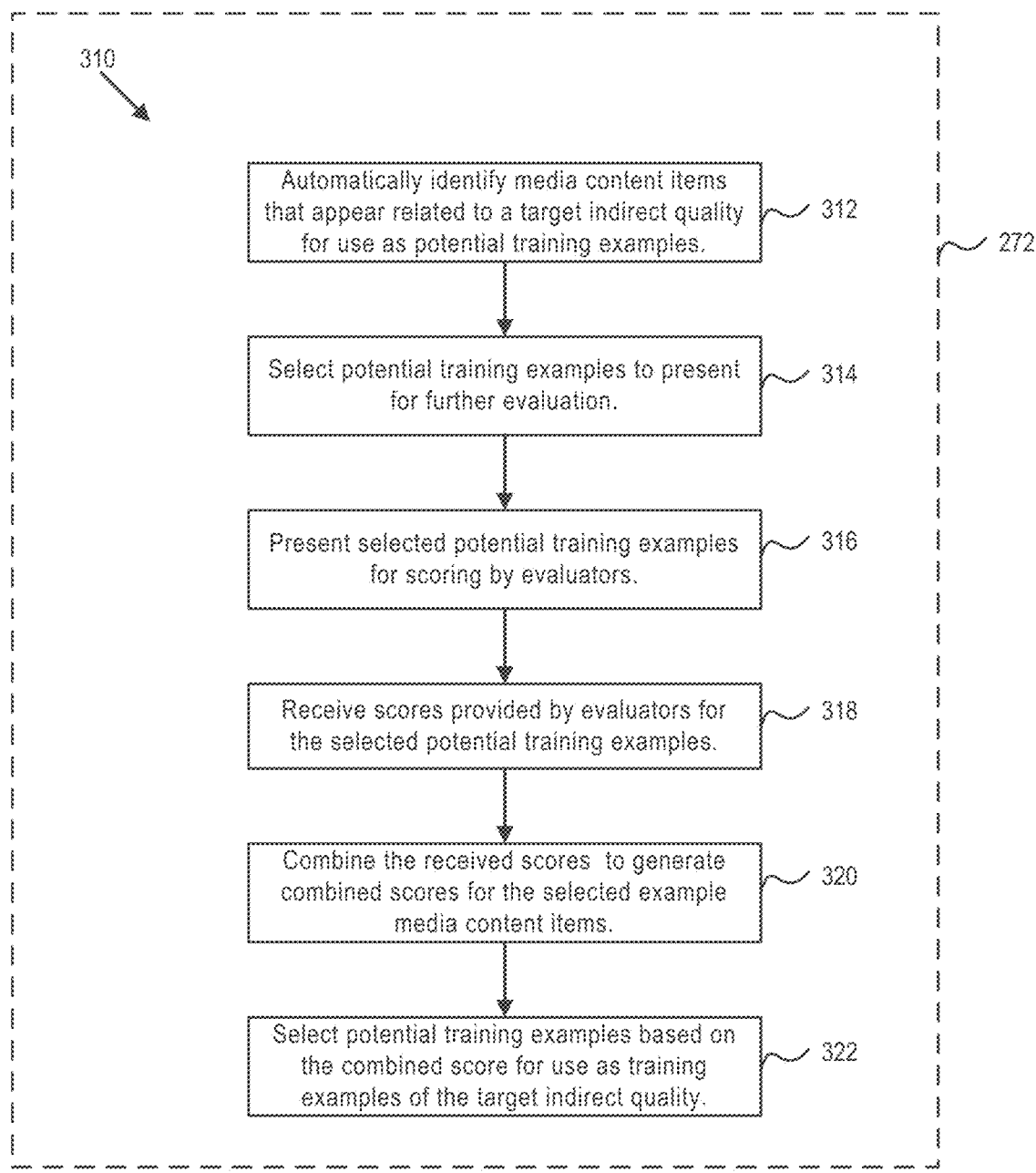
FIG. 4 illustrates an example method of acquiring training examples of media content items for an indirect quality that is performed by some embodiments of the training example acquisition engine of FIG. 2.

FIG. 4 illustrates an example method 310 of acquiring training examples of media content items for an indirect quality that is performed by some embodiments of the training example acquisition engine 240. In some embodiments, operation 272 (shown in FIG. 3) is performed using method 310. Such a method can be used, for example, to identify media content items that can be used as training examples to build a model that identifies media content items associated with a target indirect quality.

At operation 312, media content items that appear related to a target indirect quality are identified for use as potential training examples. In some embodiments, for at least some indirect qualities, the media content items identified in operation 312 are used directly as training examples to build a training model (e.g., when the automatic identification is known to have a high probability of being correct). Alternatively, the media content items identified in operation 312 are further reviewed in later operations to refine the set of potential training examples before being used to build a training model. Beneficially, operation 312 can operate to limit the quantity of media content items that must be processed by the operations of method 310, which may be time consuming and expensive to perform.

Various techniques are used to automatically identify media content items as potential training examples. For example, media content items may be automatically identified by processing the titles of media content items for terms that are associated with the target indirect quality. For example, media content items having a title that includes the word "lullaby" may be identified as potential training examples for the indirect quality of being suitable for going to sleep. Other types of descriptive information (such as album title, genre, etc.) stored in the media content metadata 216 or elsewhere may also be used to identify media content items as potential training examples. For example, media content items associated with a genre containing the word "metal" may be excluded from the automatically identified potential training examples for the indirect quality of being suitable for sleeping. Alternatively or additionally, the media content items associated with a genre containing the word "metal" may be included as potential negative training examples for the indirect quality of being suitable for sleeping.

As another example, media content items may be automatically identified as potential training examples by processing comments from users or others about the media content items. In some embodiments, the comments may be posted by users to or stored by the media-delivery system 104. Additionally, in some embodiments, comments may be posted to external services such as web sites, social media services, or crowdsourced online music datasets such as SOUNDCLOUD from SOUNDCLOUD LIMITED of Berlin, Germany and LAST.FM from LAST.FM LIMITED of London, United Kingdom.

As another example, media content items can be automatically identified by processing playlists based on keywords included in the playlist title. An example method of processing playlist titles is illustrated and described with respect to at least FIG. 11.

At operation 314, at least a portion of the potential training examples identified in operation 312 are selected for further evaluation. In some embodiments, all of the potential training examples are selected. In other embodiments, a portion of the potential training examples are selected. Additionally, in some embodiments, selection of potential training examples for further evaluation comprises processing of the potential training examples with a model (e.g., a classification model built using one or more machine learning technologies, which may be stored in the model data store 198). Selection may then be based at least in part on the scores or classification results from the model. For example, potential training examples that cannot be confidently classified by a model may be selected for presentation and further evaluation. Additionally, selection may be based on a particular genre that has been identified as being difficult to classify (e.g., by the refinement engine 248). In this manner, the selection operates to select potential training examples that, if used as training examples, are most likely to influence and improve the model.

At operation 316, at least some of the selected potential training examples are presented to evaluators for scoring. The evaluators may be people who are users of the system 100, people who are similar to a typical user of the system 100, people who have expert training with regard to a type of media content (e.g., music, video, or a particular genre thereof) or a particular indirect quality, other people, or any combination thereof.

Each (or at least some) of the selected potential training examples are presented to at least one evaluator. Alternatively, the selected potential training examples are presented to at least a predetermined number of evaluators. For example, the predetermined number may be in the range of two through ten. Further, in some embodiments, at least some of the selected potential training examples are presented to a first predetermined number of evaluators from a first group (e.g., people who are users or are similar to typical users of the system 100), and a second predetermined number of evaluators from a second group (e.g., people who are experts). For example, both the first predetermined number and the second predetermined number may be in the range of two through ten.

In at least some embodiments, the media-delivery system 104 presents selected potential training examples to the evaluators by transmitting the potential training examples to a media-playback device associated with the evaluator. In some embodiments, the media-playback device 102 plays back one of the selected potential training examples for an evaluator and displays a user interface that includes a user actuatable control to indicate whether the evaluator thinks the media content item should be associated with the target indirect quality. In some embodiments, the user actuatable control includes three states by which an evaluator can indicate that the potential training example should be a positive training example, should be a negative training example, or should not be used as a training example (e.g., the evaluator does not know or cannot determine whether the potential training example is associated with the target indirect quality). In this manner, the evaluator may assign the presented potential training example to a particular bucket that indicates the relevance of the potential training example to a particular indirect quality. Additionally, some embodiments include a user interface that operates to receive a score (such as a numeric value on a one-to-five scale) corresponding to how strongly the potential training example is associated with the target indirect quality. An example of a user interface for scoring (bucketing) a potential training example generated by some embodiments is illustrated and described with respect to at least FIG. 9.

Additionally, in some embodiments, the media-playback device 102 plays back multiple of the selected potential training examples for an evaluator and displays a user interface that includes user actuatable controls that operate to receive a comparative assessment of the selected potential training examples that were played back relative to each other. In some embodiments, two of the selected potential training examples are played back and the user interface operates to receive inputs from an evaluator to indicate which of the two potential training examples is more strongly associated with the target indirect quality. In some embodiments, the selected potential training examples are presented in various pairs such that the selected media content items can be placed in an ordered list based on the comparative results of the pairs. Alternatively or additionally, more than two potential training examples are played back and the user interface operates to receive inputs from an evaluator to order (or rank) the played back media content items relative to each other. An example of a user interface for pairwise ranking potential training examples generated by some embodiments is illustrated and described with respect to at least FIG. 10.

At operation 318, scores provided by evaluators for the selected potential training examples are received. In some embodiments, the scores are received after being transmitted from one or more media-playback devices to the media-delivery system 104. Further, in at least some embodiments, the scores are associated with an identifier of the evaluator when stored. The scores may be stored in the media data store 194, the model data store 198, or elsewhere.

At operation 320, the received scores are combined to generate combined scores for the selected potential training examples. In some embodiments, combining the received scores comprises weighting each of the received scores and calculating a weighted average based on the weighted received scores. For example, the received scores may be weighted based on an evaluator reliability score associated with the evaluator providing the received score. The evaluator reliability score may be determined empirically based on how often the evaluator has historically agreed with the majority of other evaluators. In some embodiments, the same evaluator may have multiple evaluator reliability scores, each of which corresponds to a different indirect quality. In some embodiments, evaluators who typically provide scores that correlate with the majority of other evaluators on the target indirect quality have a higher evaluator reliability score than those who do not. Additionally, in some embodiments, evaluator reliability scores are based on biographical or other information about the evaluator such as whether the evaluator has expert training or skill with regard to the indirect quality or the type of media content being evaluated.

Additionally, in some embodiments, when combining the received scores, outlier scores are excluded. Outlier scores may be scores that are significantly different than the majority of other scores for a particular potential training example and indirect quality (e.g., a score may be considered significant different if the difference between the score and the average score received is greater than a predetermined threshold). Further, machine learning techniques may be used to identify and disregard inconsistencies in the received scores.

In some embodiments, combining the received scores comprises combining pairwise ranking scores of the same two selected potential training examples that have been provided by multiple evaluators to determine a combined pairwise score for the two selected potential training examples; ordering a plurality of potential training examples based on the combined pairwise scores to generate an ordered list; and assigning a score to the potential training examples based on their positions in the ordered list. For example, to identify training examples having the target indirect quality of high energy, potential training examples A, B, and C may be presented to a plurality of evaluators for pairwise ranking of the pairs AC and BC. If the resulting combined pairwise scores indicate that A has higher energy than C, and C has higher energy than B, the media content items would be ordered as follows (from lowest to highest energy): B<C<A. Example energy scores could then be assigned by distributing the ordered list across a numeric range such as 0-1, resulting in example energy scores of: B=0; C=0.5; and A=1. Of course, this is just an example, and scores can be assigned in different ways in different embodiments. Further, some embodiments do not assign a numeric score to the potential training examples. Additionally, the pairwise scores may not always indicate a definite ordering (e.g., if the pairwise score were to indicate B had more energy than C then there would not be enough information to order B relative to A) or a consistent ordering (e.g., if an additional pairwise score were included that indicated B had more energy than A) of the list. In some embodiments, the pairwise scores are evaluated to identify additional pairings that should be presented to evaluators to resolve inconsistent orderings or indefinite orderings. Additionally, some embodiments use the magnitude of the pairwise scores to resolve inconsistent or indefinite orderings and to assign scores to the potential training examples.

At operation 322, training examples are selected based on the scores of the selected potential training examples. In some embodiments, training examples are selected based on a predetermined threshold score. For example, potential training examples having a combined score greater than 0.85 may be selected for use as training examples. In some embodiments, the threshold for selection as a potential training example is in the range of 0.5 to 0.9. Additionally, in some embodiments, a predetermined quantity or percent of the potential training examples are selected as training examples. For example, the twenty percent of the potential training examples having the highest score may be selected as positive training examples and the twenty percent having the lowest score may be selected as negative training examples. Further, in some embodiments, the distribution of scores is analyzed to identify a gaps. The gaps may be portions of the score range containing fewer than a proportional number of scores from the potential training examples occur. The score value of the identified gaps can then be used as threshold values for selecting training examples. For example, with one thousand potential training examples distributed across a scoring range of zero to one, each scoring range of 0.1 width would be expected to have one-tenth of the total number of scores (i.e., one hundred scores in this example). If the scoring range 0.7-0.8 contained only five scores it would be identified as a gap and, in some embodiments, a numeric value within the range would be used as a threshold for selecting positive training examples.

In some embodiments, the method 310 is performed multiple times based on the performance of a classification model trained using the selected training model. The performance of the classification model may be evaluated using a validation set of media content items. An example of a validation set is a plurality of media content items that are not included in the potential training examples and are labeled with regard to the target indirect quality. A score that represents the performance of the classification model can be generated by comparing the classification results of the classification model on the validation set to the corresponding labels. A higher performing classification model will have classification results that match the labels on more of the media content items in the validation set. As more training examples are used to train the classification model, the performance of the classification model will improve. However, adding training examples will often have diminishing returns. Accordingly, some embodiments, repeatedly perform the method 310 to identify additional training examples until a plateau is reached in terms of performance improvement of the validation set (e.g., the performance does not improve, improves negligibly, improves less than a predetermined amount or percentage) relative to the classification model before the additional training examples were added.

Although the method 310 has been described sequentially, in some embodiments the operations of method 310 are performed in different orders or include different operations. Additionally, in some embodiments, the operations of method 310 may be performed at different times or repeated independent of each other.

Figure 5:
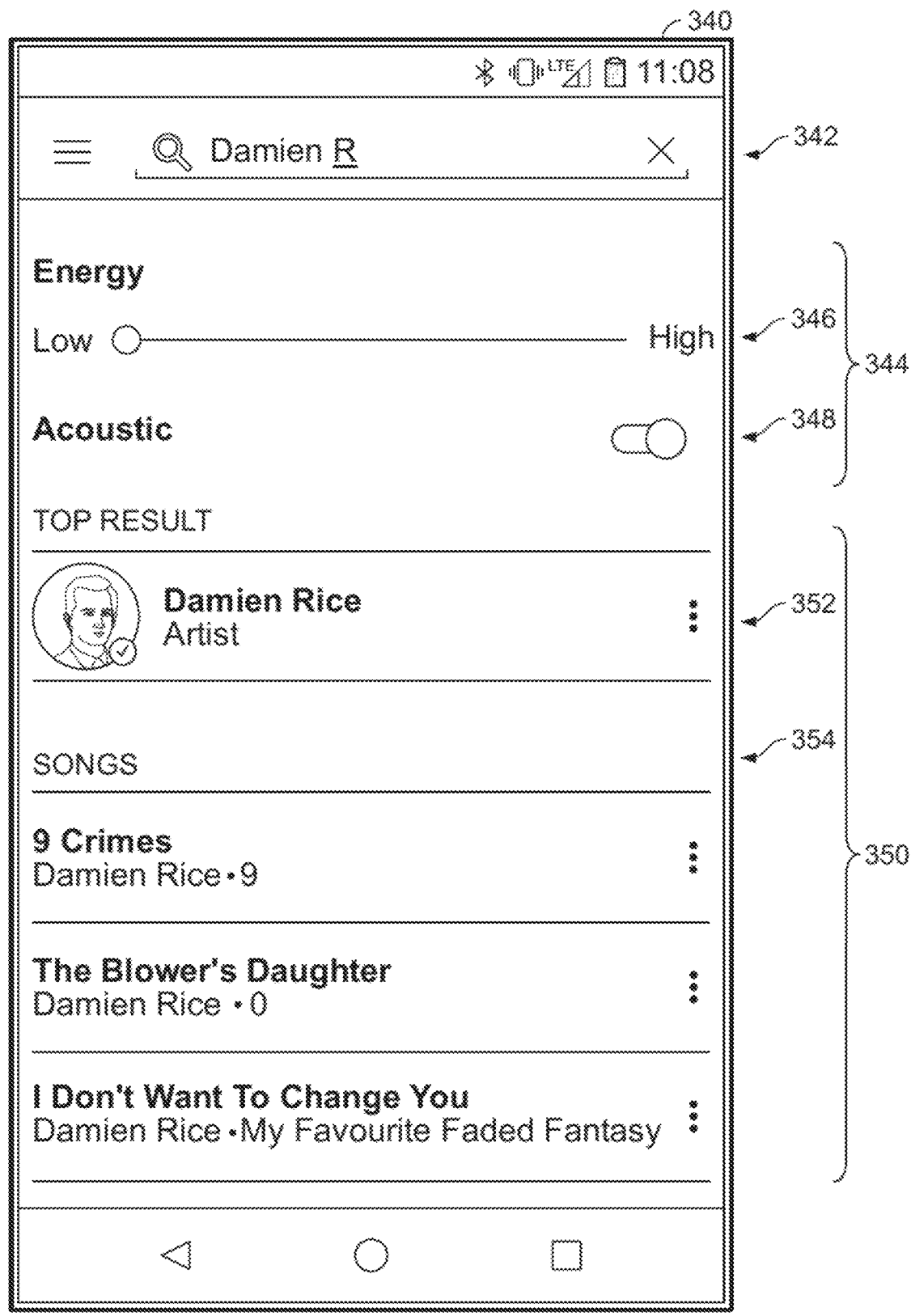
FIG. 5 illustrates an example screen for searching based on indirect qualities generated by some embodiments of the user interface of FIG. 1.

FIG. 5 illustrates an example screen 340 for searching based on indirect qualities generated by some embodiments of the user interface 164. The example screen 340 includes a keyword search input 342, an indirect quality region 344, and a results region 350.

The keyword search input 342 operates to receive a text entry from a user (e.g., via a virtual keyboard displayed by the user interface 164 (not shown), speech recognition technology, or other technology for receiving textual information).

The indirect quality region 344 operates to display user-actuatable controls for various indirect qualities. In this example, the indirect quality region 344 includes a slider 346 for setting a desired energy level and a toggle 348 for selecting whether the search results should include acoustic media content items. In other embodiments, the indirect quality region 344 may include more, fewer, or different user-actuatable controls that are associated with indirect qualities.

The results region 350 operates to present media content items that match the search criteria specified in the keyword search input 342 and the indirect quality region 344. In the example shown, the results region 350 includes a top result section 352 for showing a top result and a general results section 354 that includes a list of additional results. In some embodiments, the results appearing in the results region 350 include user-actuatable controls that when actuated perform certain actions such as starting playback of the associated media content item.

Figure 6:
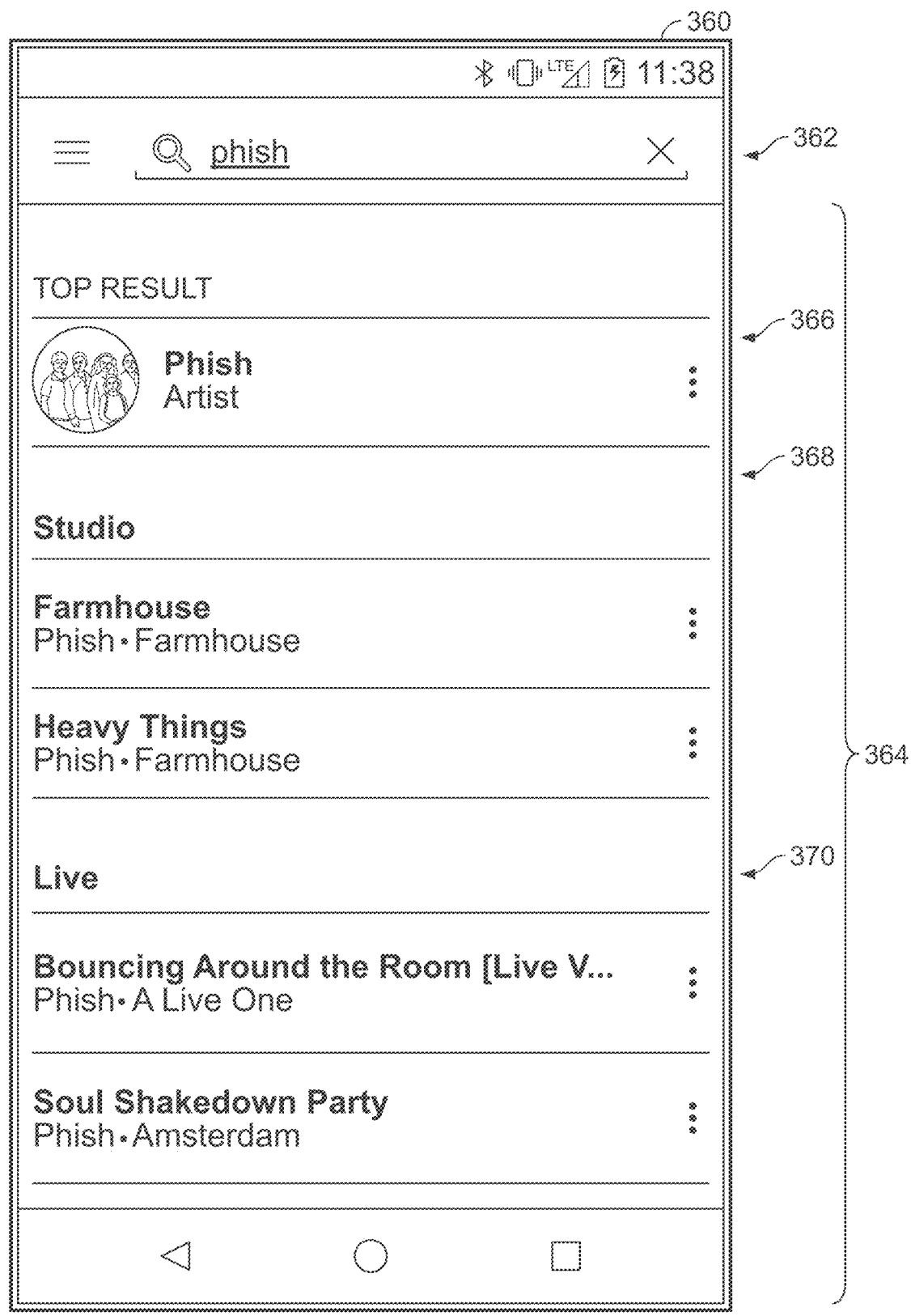
FIG. 6 illustrates an example screen for displaying search results that are classified based on indirect qualities generated by some embodiments of the user interface of FIG. 1.

FIG. 6 illustrates an example screen 360 for displaying search results that are classified based on indirect qualities generated by some embodiments of the user interface 164. The example screen 360 includes a keyword search input 362 and a results region 364. The keyword search input 362 may be similar to the previously-described keyword search input 342.

The results region 364 includes a top result section 352 for showing a top result, a first grouping 368 of results, and a second grouping 370 of results. In this example, the first grouping 368 shows results having the indirect quality "Studio." The second grouping 370 shows results having the indirect quality "Live." In some embodiments, the results region 364 includes more, fewer, or different groups of classified results.

Figure 7:
FIG. 7 illustrates an example screen for displaying media content items that are similar to a target media content item based on indirect qualities generated by some embodiments of the user interface of FIG. 1.

FIG. 7 illustrates an example screen 380 for displaying media content items that are similar to a target media content item based on indirect qualities generated by some embodiments of the user interface 164. The example screen 380 includes a textual display region 382, a user-actuatable control 384, a results region 386, and a currently playing region 388.

The textual display region 382 displays information about indirect qualities that have been identified from the target media content item and are being used to search for similar media content items. In this example, the indirect qualities of high energy and studio have been identified from the target media content item. Other embodiments, may identify and use more, fewer, or different indirect qualities.

The user-actuatable control 384 is any type of user interface element that a user can actuate. The user-actuatable control 384 operates to begin playback of the similarity results listed in the results region 386.

The results region 386 displays a list of media content items that are similar to the target media content item based on at least the indirect qualities identified in the textual display region 382. In some embodiments, other properties are used in addition to indirect qualities to select the similar media content items such as genre and era.

The currently playing region 388 displays information and user actuatable controls related to a media content item that is currently playing. In some embodiments, the currently playing media content item is used as the target media content item for a similarity search.

Figure 8:
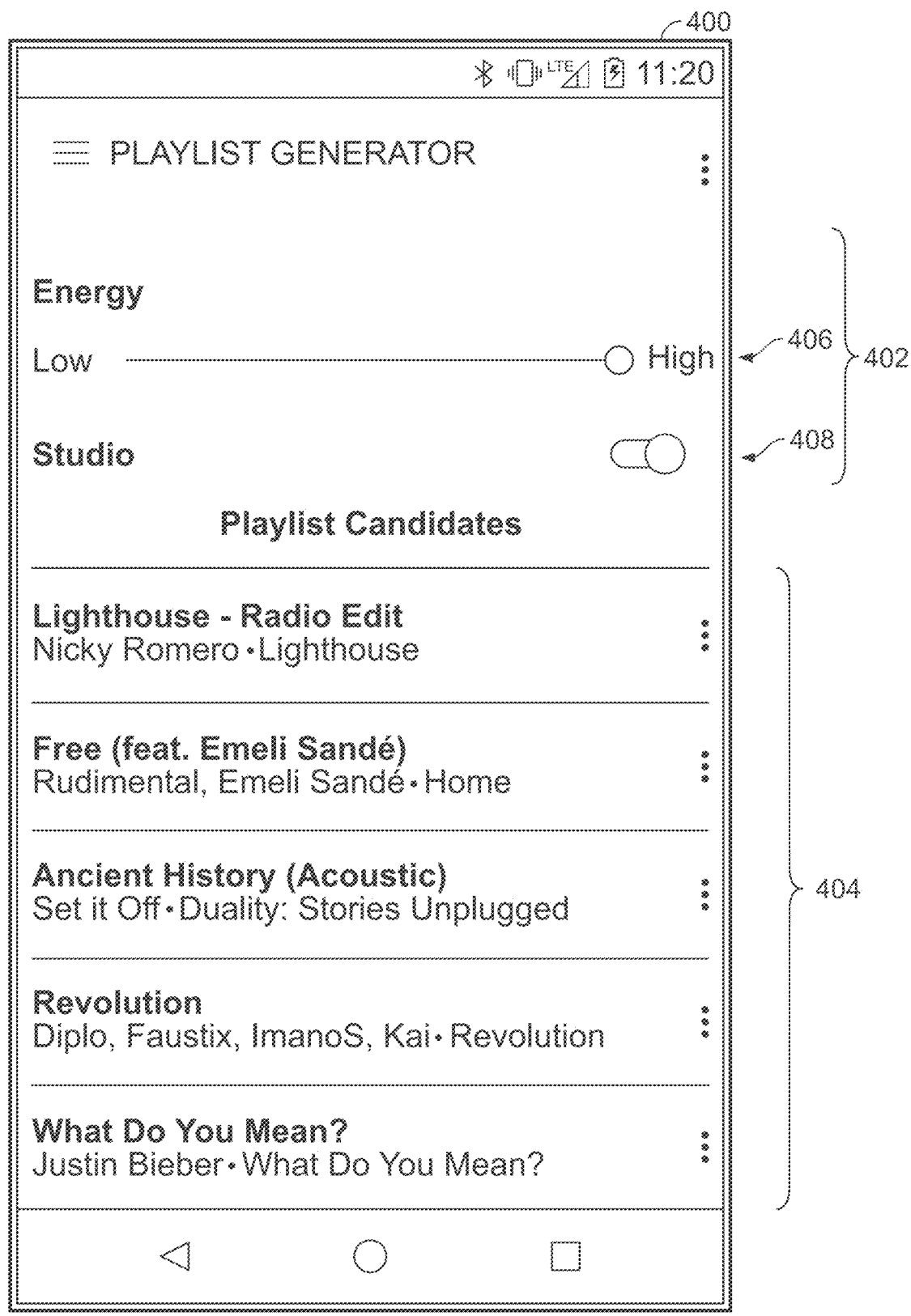
FIG. 8 illustrates an example screen for generating a playlist based on indirect qualities generated by some embodiments of the user interface of FIG. 1.

FIG. 8 illustrates an example screen 400 for generating a playlist based on indirect qualities generated by some embodiments of the user interface 164. The example screen 400 includes an indirect quality region 402, and a results region 404.

The indirect quality region 402 may be similar to the indirect quality region 344, which has been previously described. In this example, the indirect quality region 402 includes a slider 40 for setting a desired energy level and a toggle 408 for selecting whether the search results should include studio media content items. In other embodiments, the indirect quality region 402 may include more, fewer, or different user-actuatable controls that are associated with indirect qualities.

The results region 404 operates to present media content items that match the indirect qualities specified in the indirect quality region 402. In some embodiments, additional criteria are used to select the results shown in the results region 404 such as genre, era, keywords, tempo, etc. In some embodiments, the results appearing in the results region 404 include user-actuatable controls that when actuated perform certain actions such as adding the associated media content item to a playlist.

Figure 9:
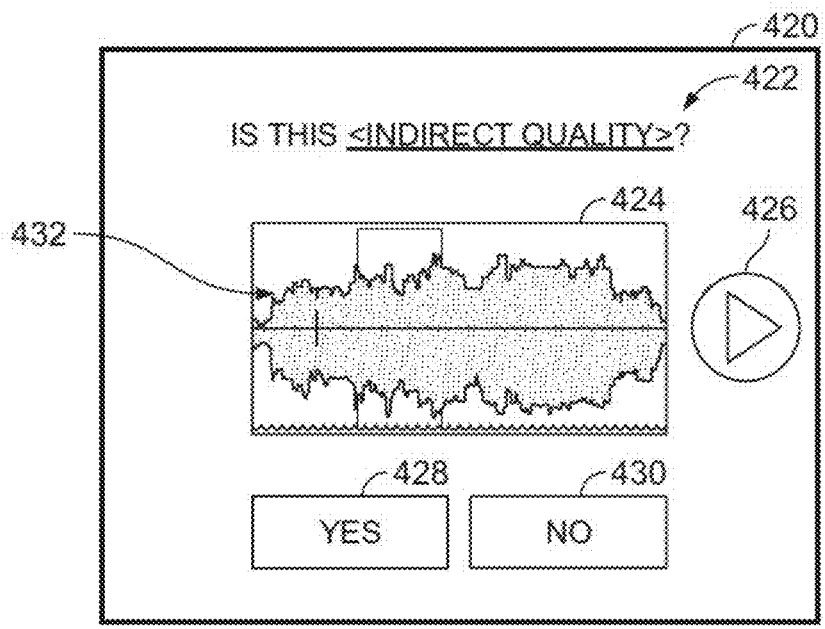
FIG. 9 illustrates an example screen for scoring a media content item generated by some embodiments of the user interface.

FIG. 9 illustrates an example screen 420 for scoring (bucketing) a media content item generated by some embodiments of the user interface 164. For example, the screen 420 may be generated for an evaluator to evaluate a media content item that has been identified as a potential training example. Although the examples herein relate to indirect qualities, the example screen 420 may also be used to allow evaluators to evaluate other properties of a media content item as well.

The example screen 420 includes a textual display region 422, a media content playback panel 424, a user-actuatable play control 426, a user-actuatable yes control 428, and a user-actuatable no control 430.

The textual display region 422 operates to display a textual prompt related to a target indirect quality. In the example shown, the textual display region 422 says "IS THIS <INDIRECT QUALITY>?" Typically, the "<INDIRECT QUALITY>" portion of the text would be replaced by a description of a target indirect quality (e.g., danceable, runnable, speech, live, acoustic, positive, etc.) when the screen 420 is displayed to an evaluator.

The media content playback panel 424 operates to playback a media content item. For example, the media content playback panel 424 may display an audio spectrum corresponding to the media content item when the media content item comprises an audio recording. As another example, the media content playback panel 424 may display video output when the media content item comprises a video recording. Some embodiments may include both an audio spectrum and a video output. In the example shown, the media content playback panel 424 includes a playback position indicator 432 that indicates the current position of playback in the media content file. Further, in some embodiments, an evaluator may actuate the playback position indicator 432 to adjust the current position of playback within the media content item (e.g., to re-evaluate a portion of the media content item).

The user-actuatable play control 426 operates to receive an input indicating to begin playback of the media content item. The user-actuatable yes control 428 operates to receive an input indicating that the user does consider the media content item to be associated with the target indirect quality. The user-actuatable no control 430 operates to receive an input indicating that the user does not consider the media content item to be associated with the target indirect quality.

Figure 10:
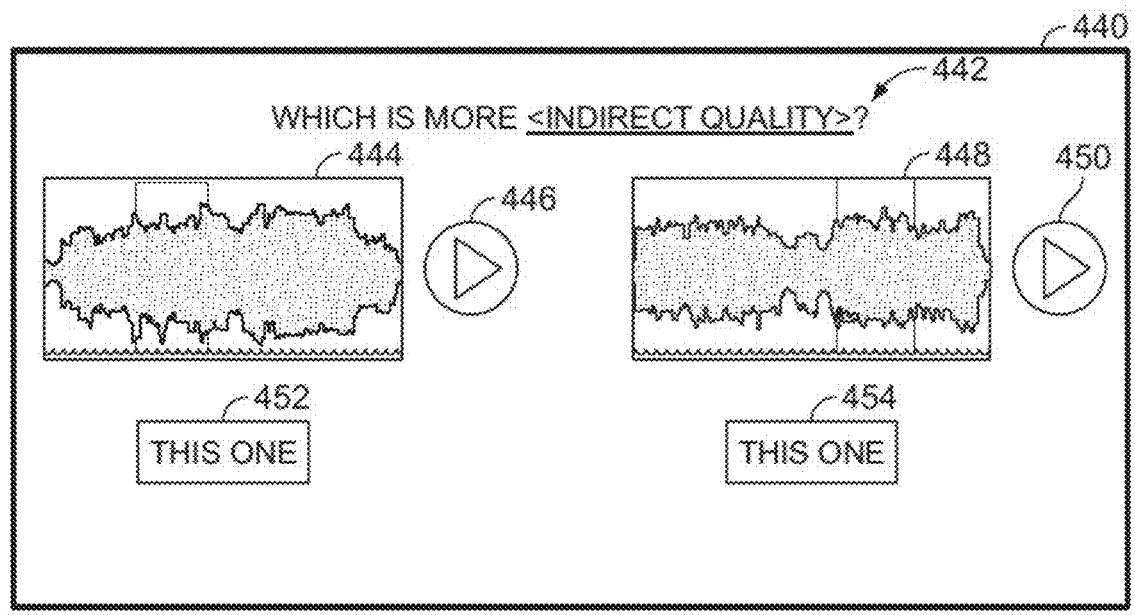
FIG. 10 illustrates an example screen for comparing (ranking) a pair of media content items generated by some embodiments of the user interface.

FIG. 10 illustrates an example screen 440 for comparing (ranking) a pair of media content items generated by some embodiments of the user interface 164. For example, the screen 440 may be generated for an evaluator to comparatively evaluate a pair of media content item that have been identified as potential training examples. Although the examples herein relate to indirect qualities, the example screen 440 may also be used to allow evaluators to evaluate other properties of a media content item as well.

The example screen 440 includes a textual display region 442, a first media content playback panel 444, a first user-actuatable play control 446, a second media content playback panel 448, a second user-actuatable play control 450, a first user-actuatable select control 452, and a second user-actuatable select control 430.

The textual display region 442 operates to display a textual prompt related to a target indirect quality. In some embodiments, the textual display region 442 prompts an evaluator to select the presented media content item that is more strongly associated with a target indirect quality. In the example shown, the textual display region 442 says "WHICH IS MORE <INDIRECT QUALITY>?" As described previously, the "<INDIRECT QUALITY>" portion of the text would be replaced by a description of a target indirect quality (e.g., danceable, runnable, speech, live, acoustic, positive, etc.) when the screen 440 is displayed to an evaluator.

The first media content playback panel 444 operates to playback a first media content item, and the second media content playback panel 448 operates to playback a second media content item. In at least some embodiments, the first media content playback panel 444 and the second media content playback panel 448 are similar to the previously described media content playback panel 424.

The first user-actuatable play control 446 operates to receive an input indicating to begin playback of the first media content item and the second user-actuatable play control 460 operates to receive an input indicating to begin playback of the second media content item. In some embodiments, the first user-actuatable play control 446 and the second user-actuatable play control 450 are similar to the previously described user-actuatable play control 426.

The first user-actuatable select control 452 operates to receive an input indicating that the user consider the first media content item to be more strongly associated with the target indirect quality than the second media content item is. The second user-actuatable select control 454 operates to receive an input indicating that the user considers the second media content item to be more strongly associated with the target indirect quality than the first media content item is.

Figure 11:
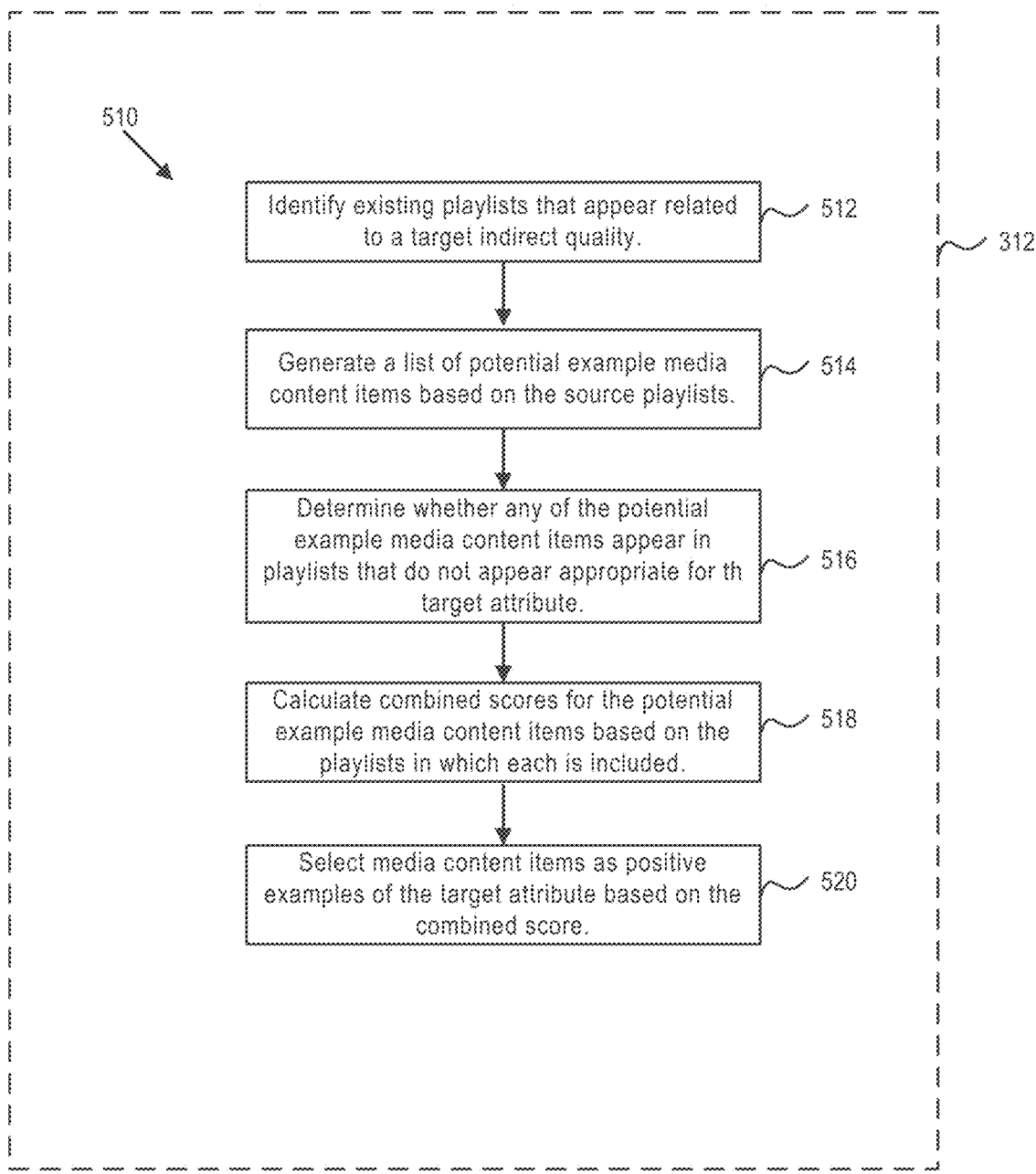
FIG. 11 illustrates an example method of acquiring training examples of media content items for an indirect quality by processing playlists that is performed by some embodiments of the training example acquisition engine.

FIG. 11 illustrates an example method 510 of acquiring training examples of media content items for an indirect quality by processing playlists that is performed by some embodiments of the training example acquisition engine 240. In some embodiments, the training example acquisition engine 240 includes a playlist analysis engine that operates to perform the method 510. In some embodiments, the operation 312 (shown in FIG. 4) is performed using the method 510. Such a method can be used, for example, to identify media content items as being associated with a particular indirect quality based on the playlists users have created. Many of the examples described herein relate to identifying media content items that are runnable (i.e., suitable for playback while a user is running). However, the same or similar techniques can be applied to analyze playlists for other indirect qualities as well.

At operation 512, playlists that appear related to a target indirect quality are identified as source playlists. The playlists may be identified by analyzing the playlists 218. In some embodiments, source playlists are identified based on the inclusion of certain words or phrases in a title or description associated with the playlist. For example, words that are related to running (e.g., run, running, jog, marathon, 5 k, etc.) may be used to identify source playlists for the indirect quality of being runnable. Additionally, in some embodiments, words that relate to fitness (work out, health club, training, etc.) are also used to identify source playlists for running as well. Furthermore, in some embodiments, words that relate to other activities that are similar to running such are also used to identify source playlists.

At operation 514, a list of potential example media content items is generated based on the source playlists. In some embodiments, all media content items appearing in at least a predetermined number of playlists are included in the list. In embodiments, the predetermined number is 1, 2, 5, 10, 50, 100, 500, or another number.

Further, some embodiments analyze the source playlists to further determine the relevance of the playlist to the target indirect quality. The analysis may be based on many factors including the words that were used to identify the source playlist, whether the words appeared in a title or a description, the curator of the playlist, the number of users that follow the playlist, the number of times the playlist has been played, etc. In some embodiments, a weighting scheme is used to calculate a weight value for the source playlists. Example weighting schemes used for in one embodiment include: weighting a playlist that includes words associated specifically with the target indirect quality higher than a playlist that includes words associated a general category that includes the target indirect quality (e.g., with respect to the indirect quality of runnable, fitness or work out) or words associated with indirect qualities that are similar to the target indirect quality (e.g., with respect to the indirect quality of runnable, other repetitive-motion activities like cycling, etc.); weighting a playlist that includes a relevant word in a title higher than a playlist that includes a relevant word in a description; weighting a playlist curated by a streaming service (or professional curator) higher than a playlist curated by a user (or vice versa); weighting a playlist with more followers higher than a playlist with fewer followers; weighting a playlist that has been played more times higher than a playlist that has been played fewer times. In some embodiments, the weighted values of the source playlist that include a particular potential example media content item are summed (or otherwise combined) and the resulting value (referred to as a positive playlist inclusion score herein) is compared to a predetermined threshold. The potential example media content items with a positive playlist inclusion score that exceeds the threshold may be analyzed further as described below.

At operation 516, it is determined whether the potential example media content items are included in playlists that appear inappropriate for the indirect quality. In some embodiments, playlists are identified as inappropriate for an indirect quality if based on the inclusion of words that are related a concept that contrasts with the indirect quality. For example with the indirect quality of runnable, playlists may be identified as inappropriate based on the inclusion of words or phrases in a title that are related to relaxing (e.g., calming, chill, relax, wind down, sleep, calm, etc.). In some embodiments, a negative playlist inclusion score is calculated for the potential example media content items based on being included in playlists that are identified as not being appropriate for running. The negative playlist inclusion score for a potential example media content item is calculated in a similar manner and according to similar factors as the positive playlist inclusion score.

At operation 518, a combined playlist inclusion score is calculated for the potential example media content items included in the list based on the playlists in which the potential example media content items are included. In some embodiments, the combined playlist inclusion score is calculated as a ratio of the positive playlist inclusion score to the negative playlist inclusion score. In other embodiments, the combined playlist inclusion score is calculated otherwise, such as by calculating a difference between the positive playlist inclusion score and the negative playlist inclusion score. Further, in some embodiments, the combined playlist inclusion score is calculated as a difference between or ratio of the number of playlists that appear related to the indirect quality and the number of playlists that appear inappropriate for the indirect quality in which the media content item is included.

At operation 520, potential example media content items are selected as positive example media content items based upon the combined playlist inclusion score In some embodiments, potential example media content items that have a combined playlist inclusion score exceeding a predetermined threshold are selected as positive examples of the indirect quality. As an example, when the combined playlist inclusion score is calculated as a ratio, the predetermined threshold is two, three, four, five, or ten in some embodiments. Other embodiments use a predetermined threshold in a range of one to twenty-five. Additionally, in some embodiments, a predetermined number of media content items having the highest combined playlist inclusion scores are selected as positive examples.

Although the method 510 has been described sequentially, in some embodiments the operations of method 510 are performed in different orders or include different operations. Additionally, in some embodiments, the operations of method 510 may be performed at different times or repeated independent of each other.

Figure 12:
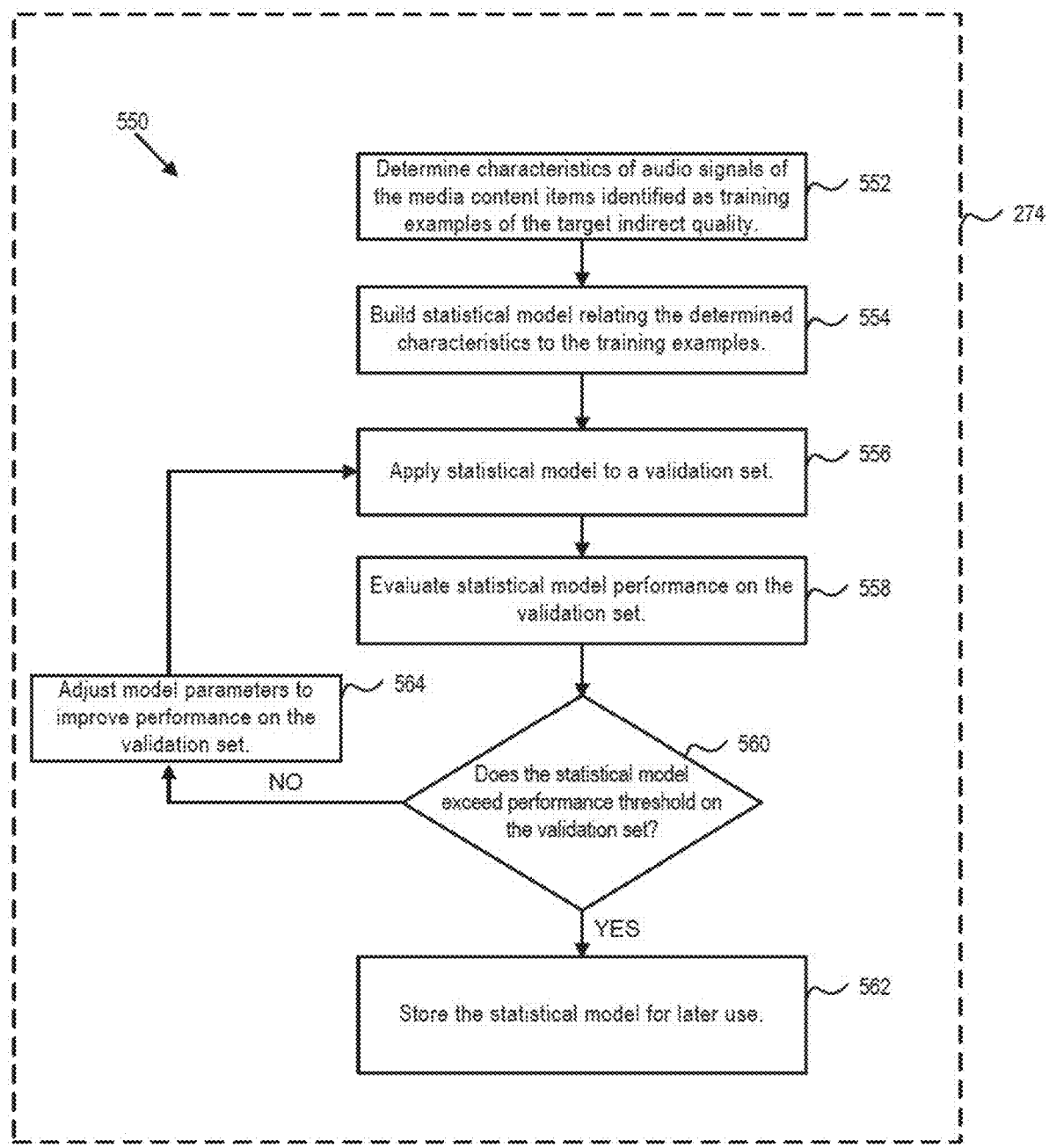
FIG. 12 illustrates an example method of building a model based on training examples of media content items associated with a target indirect quality that is performed by some embodiments of the model building engine.

FIG. 12 illustrates an example method 550 of building a model based on training examples of media content items associated with a target indirect quality that is performed by some embodiments of the model building engine 242. Such a method can be used, for example, to build a model for classifying or identifying additional media content items as being associated with the target indirect quality. In some embodiments, the operation 274 (shown in FIG. 3) is performed using the method 550.

At operation 552, characteristics of the audio signals of the training examples are determined. In some embodiments, the audio signals of the training examples are analyzed to determine the characteristics. Additionally, in some embodiments, some or all of the characteristics of the audio signals are retrieved from the media content metadata 216 or elsewhere. Further, in some embodiments, the audio signals are divided into segments for individual analysis and are then combined. Determining characteristics of an audio signal by dividing it into segments is illustrated and described with respect to at least FIG. 15.

Example characteristics determined by some embodiments include an average duration of a musical event such as a single note or other musical event, a tempo regularity, a percussivity, and a beat strength. In some embodiments, the average duration of a musical event is calculated in various ways, including by dividing a total number of musical events in a media content item by a duration of the media content item. The tempo regularity corresponds to the consistency of the beat in a media content item. In some embodiments, the tempo regularity is based on calculating a standard deviation or variance value for measurements of the tempo over multiple intervals of a media content item. The percussivity corresponds to the strength or contribution of percussive instruments (or synthesized equivalents) to the media content item. The beat strength is proportional to the loudness of musical events that happen in correspondence to a beat. Some embodiments also include other characteristics such as indirect qualities that are determined by other machine learning models. For example, some embodiments, include an energy characteristic that is calculated by a machine learning model trained to rate the relative energy levels of various media content items similarly to a user's rating. Other embodiments determine additional, different, or fewer characteristics. In some embodiments, the set of characteristics that are used are determined manually (e.g., through a user interface in which a user identifies at least some characteristics of interest). Alternatively, in some embodiments, deep learning techniques are used to select characteristics. Deep learning techniques may comprise the use of artificial neural networks to analyze the audio signals of training examples and identify characteristics that are useful in classifying media content items.

At operation 554, the determined characteristics are used to build a statistical model that relates the determined characteristics to the training examples. In some embodiments, the model is a function or equation that operates on the values of the various characteristics to calculate a value corresponding to the similarity to the positive examples. Alternatively, the model is a function or equation that operates to classify a media content item as either being more similar to the positive training examples or more similar to the negative training examples.

In some embodiments, the model represents each characteristic as a dimension in a multi-dimensional space and distance values are calculated from one or more prototype positive training models. Further, in some embodiments, distance values are also calculated from one or more prototype negative training models. A prototype training example may be a model that is generally representative of many of the training examples. In some embodiments, prototype training examples are selected from among the training examples. Additionally, in some embodiments, the prototype training examples are generated by a machine learning technology such as support vector machine. Further, in some embodiments, the model defines an equation to compute the likelihood of a media content item being similar to the positive examples as far as the modeled characteristics are concerned.

In some embodiments, one or more machine learning techniques are used to generate the model. Example machine learning techniques include variational Bayes Gaussian mixture models, support vector machines, artificial neural networks, k-means clustering, logistic regression, latent dirichlet allocation, spectral hashing, and other machine learning techniques.

At operation 556, the statistical model is applied to a validation set. As described previously, the validation set may comprise media content items that have known values with regard to the target indirect quality. When the statistical model is applied to the validation set, it may generate a classification result for the media content items in the validation set. These generated classification results can be compared to the known (or expected) values for the examples in the validation set to quantify how well the model is performing.

At operation 560, it is determined whether the statistical model exceeds a performance threshold with regard to the validation set. In some embodiments, the performance threshold relates to a target percentage of the validation set that should be classified correctly. If the statistical model exceeds the performance threshold the method 550 continues to operation 562. Alternatively, if the performance threshold is not exceeded, the method 550 continues to operation 564.

At operation 562, the model is stored for later use in evaluating media content items. In some embodiments, even though the model exceeded the performance threshold, any misclassified media content items are further evaluated to identify common features. Examples of common features may include audio/recording properties (duration, variation, etc.), biographical information (e.g., genre, artist, era, etc.), and other information. The model may then be revised to further improve performance on media content items that share the identified common features.

At operation 564, model parameters are adjusted to improve performance on the validation set. Various techniques such as gradient descent, randomized hill climbing, etc. may be used to adjust the model parameters. The parameters that are adjusted may be technique-specific parameters and based on the machine-learning technique used to generate the model. Additionally, in some embodiments, the classification threshold (e.g., the scores required to classify a media content item as having the target indirect quality are adjusted to improve performance).

Although the method 550 has been described sequentially, in some embodiments the operations of method 550 are performed in different orders or include different operations. Additionally, in some embodiments, the operations of method 550 may be performed at different times or repeated independent of each other.

Figure 13:
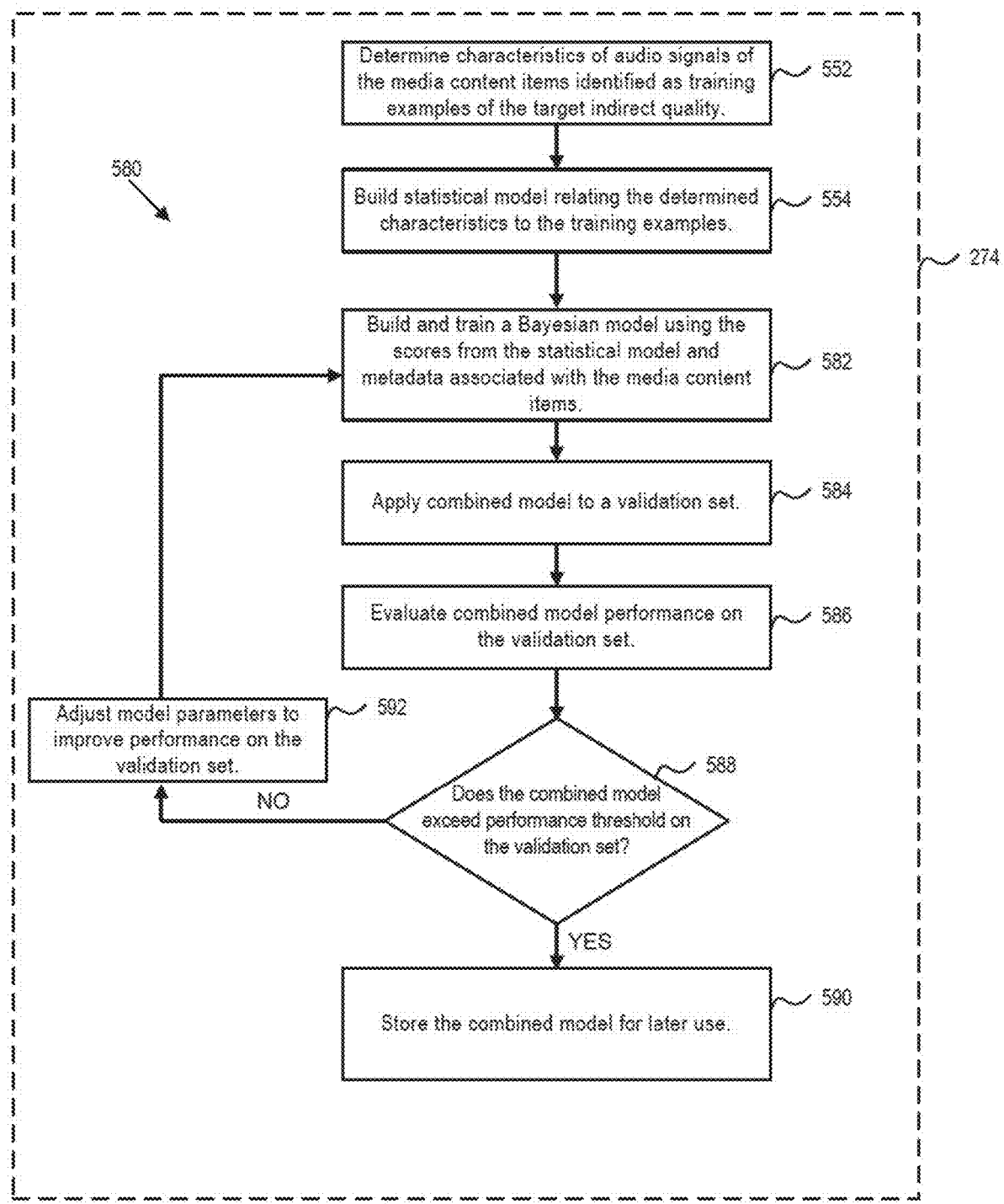
FIG. 13 illustrates an example method of building a model based on training examples of media content items associated with a target indirect quality that is performed by some embodiments of the model building engine.

FIG. 13 illustrates an example method 580 of building a model based on training examples of media content items associated with a target indirect quality that is performed by some embodiments of the model building engine 242. The method 580 is similar to the method 550, except that the method 580 includes additional operations related to training and using a Bayesian model. Such a method can be used, for example, to build a combined model for classifying or identifying additional media content items as being associated with the target indirect quality. In some embodiments, the operation 274 (shown in FIG. 3) is performed using the method 580.

As described previously, at the operation 552, characteristics of the audio signals of the training examples are determined. As also described previously, at the operation 554, the determined characteristics are used to build a statistical model that relates the determined characteristics to the training examples.

At operation 582, a Bayesian model is built and trained using the output of the statistical model and prior knowledge (e.g., genre, style, etc.) about the media content items. The Bayesian model may comprise a probabilistic graphical model comprising joint probabilities based on various prior knowledge and the output of the statistical model. The joint probability may then be used to, for example, determine appropriate threshold values for the scores from the statistical model based on the prior knowledge. For simplicity, a Bayesian model is built to classify songs based using genre in classification with the previously described statistical model. However, other embodiments apply to different types of media content and use different prior knowledge about the media content items.

Prior knowledge about a media content item may bias whether the media content item is associated with a particular attribute. For example, songs that are associated to the genre "classical" are mostly acoustic, while the opposite is true for songs that are associated to the genre "metal," which are mostly not acoustic. Based on analyzing the training examples, the Bayesian model can classify new songs. The information provided by the genre of a song can be used to identify probable classification errors and "correct" them.

For example, using the probabilistic nature of the model, thresholds can be computed based on genre (or other prior knowledge). Possible outliers (e.g., an acoustic "metal" song) can still be classified correctly provided that the underlying statistical model generates a score that is high enough (e.g., above a higher threshold for the genre metal) indicating greater confidence in the result of the statistical model). For example, a metal track classified as acoustic with a score of 0.6 from the statistical model is probably misclassified, while a higher score such as 0.9 or above suggests that the track is in fact acoustic, even if that makes it an exception to its genre.

Furthermore, in some embodiments, media content items are not directly associated with a genre, but are instead associated with an artist who is associated with one or more genres. In some embodiments, the Bayesian model can combine the probabilities for each associated genre when determining an appropriate threshold. For example, a song associated with an artist that is 70% associated with the genre metal and 30% associated with the genre alternative may have a threshold calculate based on weighted combination of the thresholds for metal and alternative (e.g., where the weighting corresponds to the percentage the artist is associated with each of the genres).

Further, in some embodiments, the Bayesian model operates to predict multiple indirect qualities jointly. In this manner, the joint prediction may result in greater accuracy than the prediction of each indirect quality by itself, as the indirect qualities can operate to "help each other out" during the prediction process (e.g., a prediction that a song associated with the genre metal that has the indirect quality of being lower energy may further support a prediction that it also associated with the indirect quality of being acoustic).

In at least some embodiments, the Bayesian model is trained using a Monte Carlo approach such as Gibbs Sampling.

Figure 14:
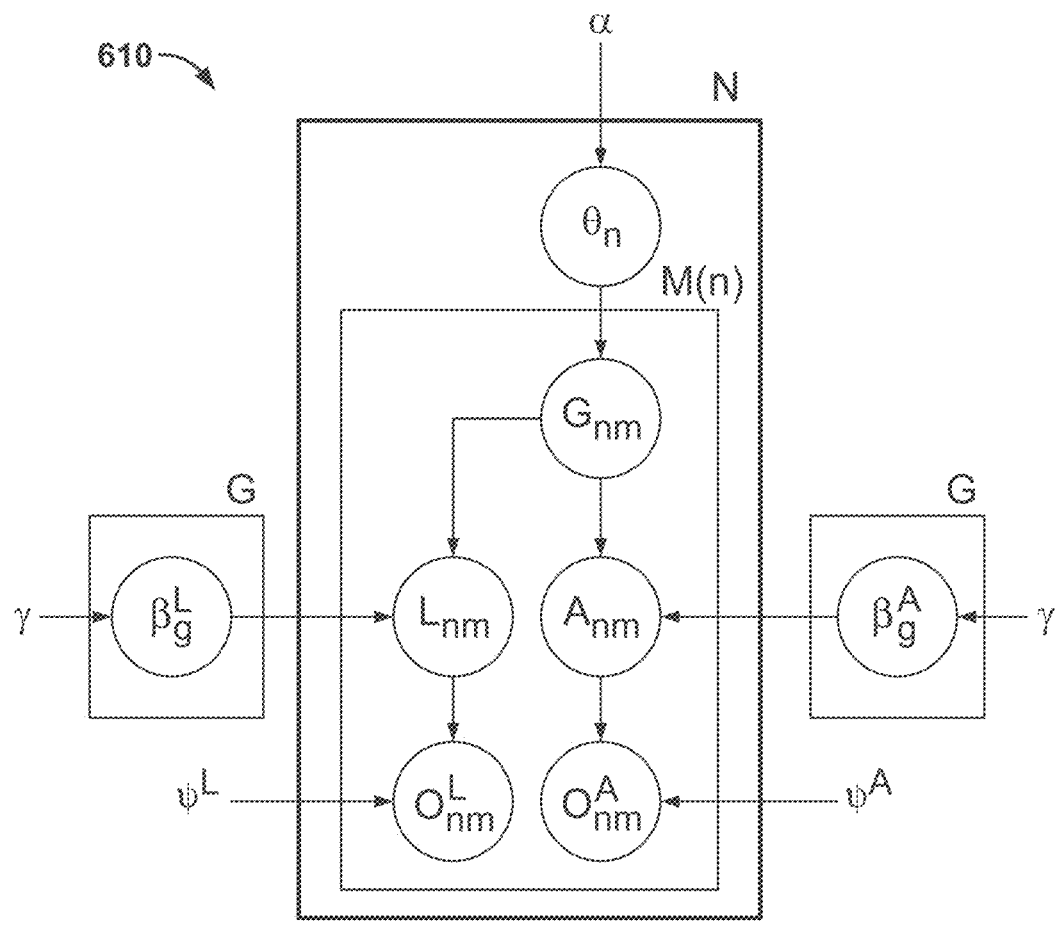
FIG. 14 shows an example probabilistic graphical model for estimating indirect qualities used in some embodiments of the example method of FIG. 13.

FIG. 14 shows an example probabilistic graphical model 610 for estimating indirect qualities used in some embodiments of the example method 580. In this example, the probabilistic graphical model 610 is for estimating liveness (L) and acousticness (A) for a collection of N artists associated to M(n) songs, given the attributes computed from the audio signal ($\theta^L$, $\theta^A$), and a distribution $\theta$ over G genres for the artist. The R variables control the genre biases. Other embodiments operate on other indirect qualities.

Returning now to FIG. 13, at operation 584, the combined model is applied to the validation set. The operation 584 may be similar to the operation 556, which has been previously described.

At operation 586, the performance of the combined model on the validation set is evaluated. The operation 586 may be similar to the operation 558, which has been previously described.

At operation 588, it is determined whether the combined model exceeds a performance threshold on the validation set. The operation 588 may be similar to the operation 560, which has been previously described. If the combined model exceeds the performance threshold the method 580 continues to operation 590. Alternatively, if the performance threshold is not exceeded, the method 580 continues to operation 592.

At operation 590, the combined model is stored for later use. The operation 590 may be similar to the operation 562, which has been previously described.

At operation 592, model parameters in either the statistical model or the Bayesian model are adjusted to improve performance on the validation set. The operation 592 may be similar to the operation 564, which has been previously described.

Although the method 580 has been described sequentially, in some embodiments the operations of method 580 are performed in different orders or include different operations. Additionally, in some embodiments, the operations of method 580 may be performed at different times or repeated independent of each other.

Figure 15:
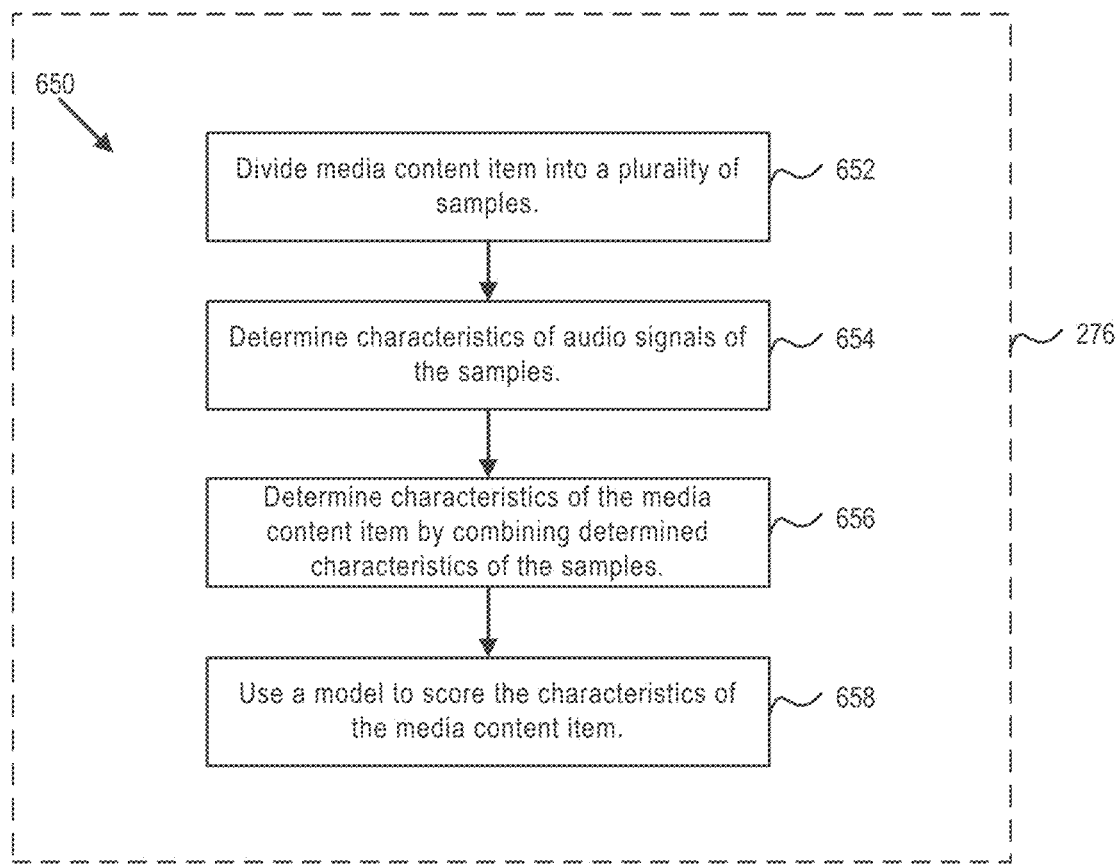
FIG. 15 illustrates an example method of evaluating a media content item using a statistical model that is performed by some embodiments of the content evaluation engine of FIG. 2.

FIG. 15 illustrates an example method 650 of evaluating a media content item using a statistical model that is performed by some embodiments of the content evaluation engine 244. Such a method can be used, for example, to calculate a score for the media content item corresponding to the media content items predicted association with a target indirect quality. In some embodiments, the operation 276 (shown in FIG. 3) is performed using the method 650.

At operation 652, the media content item is divided into a plurality of samples. In some embodiments, the media content items are divided into samples of a fixed duration (e.g., 1 seconds, 5 seconds, 10 seconds, 1 minute, or any other duration). In other embodiments, the media content items are divided into a pre-determined number of samples (e.g., 5, 10, 15, 25, 50, 100, or any other number of samples). Further, in other embodiments, the media content item is divided into samples based on changes in the signal (e.g., an increase in volume, a change in tempo, a change in pitch, etc.).

At operation 654, the characteristics of the audio signal (or other recorded data) of the media content item are determined. The operation 654 is similar to the operation 552 except that the characteristics are determined for the samples of the media content item being evaluated rather than the training examples.

At operation 656, characteristics of the media content item being evaluated are determined by combining the determined characteristics. Various techniques for combining the samples are used in various embodiments. Some embodiments, combined the determined characteristics from the samples into a single mid-level feature value for the media content item using for example, an average value of the characteristic value, a standard deviation of a characteristic value, a characteristic value representing a majority or plurality of the samples, a midpoint of the characteristic values of the samples, or based on thresholds (e.g., more than predetermined quantity or percent of samples above or below a particular threshold). Additionally, some embodiments generate a distribution value such as a histogram that represents the distribution of the determined value of a characteristic over time.

At operation 658, various of the characteristic values determined in operation 656 are used to score the media content item. In some embodiments, scoring the media content item may comprise selecting characteristics, including mid-level features and distribution features to generate a feature vector for the media content item that can be evaluated with a model. Further, in some embodiments, scoring the media content item may comprise calculating a score using a statistical model. Some embodiments also revise the score using a Bayesian model. The calculated or revised scores may be normalized as has been described previously. Additionally, some embodiments classify the media content item based on the calculated or refined score. The calculated or revised scores as well as the classification result may then be stored.

Although the method 650 has been described sequentially, in some embodiments the operations of method 650 are performed in different orders or include different operations. Additionally, in some embodiments, the operations of method 650 may be performed at different times or repeated independent of each other.

Figure 16:
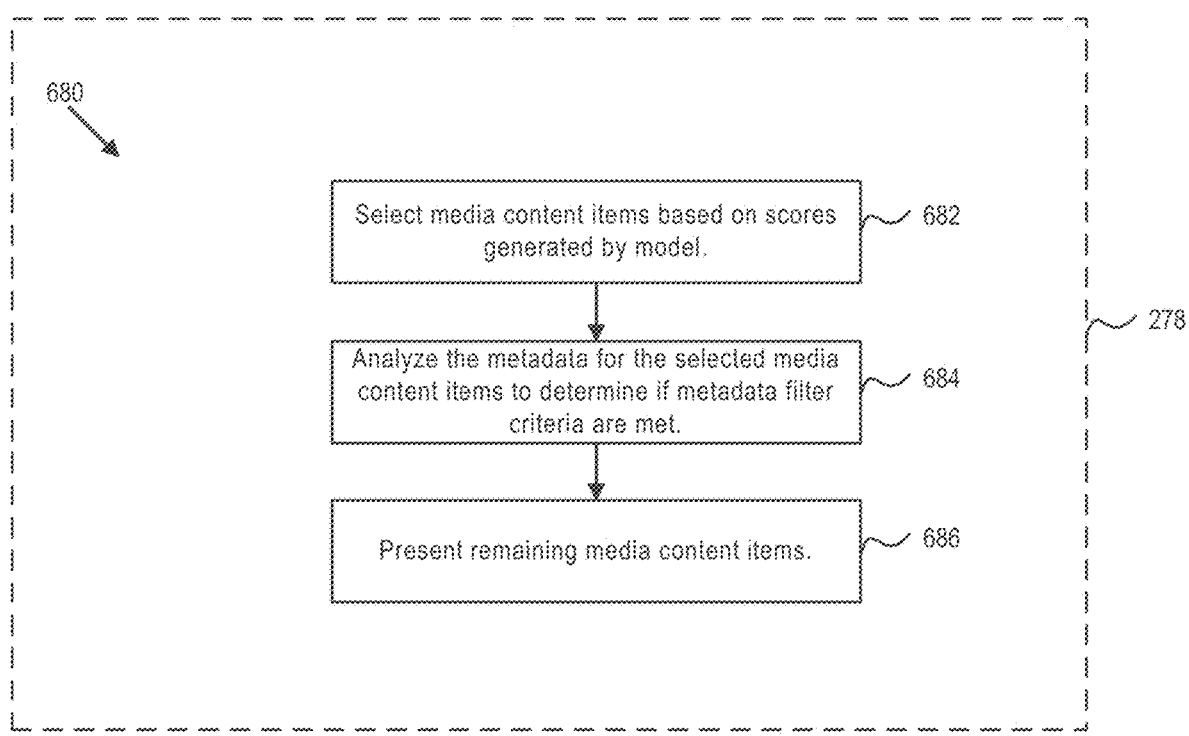
FIG. 16 illustrates an example method of selecting media content items for a target indirect quality that is performed by some embodiments of the content selection engine of FIG. 2.

FIG. 16 illustrates an example method 680 of selecting media content items for a target indirect quality that is performed by some embodiments of the content selection engine 246. Such a method can be used, for example, to exclude certain media content items from selection that are unlikely to be suitable for playback based on a target indirect attribute. In some embodiments, the operation 278 (shown in FIG. 3) is performed using the method 680.

At operation 682, media content items are selected based on scores generated by a model. For example, media content items having a score matching a value or exceeding a predefined threshold may be selected. In some embodiments, the scores are determined by analyzing the audio signals associated with the media content items (e.g., as illustrated and described with respect to at least FIG. 15). In some embodiments, the scores are retrieved from a data store such as the media data store 194.

At operation 684, the metadata associated with the selected media content items is analyzed to determine if metadata filter criteria are met. In some embodiments, the metadata for the media content items being evaluated is retrieved from the media content metadata 216, or elsewhere.

The metadata filters may operate to exclude media content items having certain metadata characteristics that may make the media content item inappropriate for purposes associated with the indirect quality. For example, some embodiments include a genre filter that operates to exclude media content items of a particular genre (e.g., children's music or holiday music). Other embodiments include additional, different, or fewer metadata filters.

At operation 686, the remaining media content items are presented. In some embodiments, presenting the media content items comprises transmitting a list that identifies the media content items to the media-playback device 102. Additionally, in some embodiments, presenting the remaining media content items comprises generating or displaying a user interface that lists some of the remaining media content items. Further, in some embodiments, the remaining media content items are presented by beginning playback of or more of the media content items. Further, in some embodiments, a score associated with a particular indirect quality is updated based on the filtering performed in operation 684. For example, a runnability score corresponding to how suitable a media content item is for playback during running may be set to 0 if it is filtered by operation 684 for being holiday music.

Although the method 680 has been described sequentially, in some embodiments the operations of method 680 are performed in different orders or include different operations. Additionally, in some embodiments, the operations of method 680 may be performed at different times or repeated independent of each other.

Figure 17:
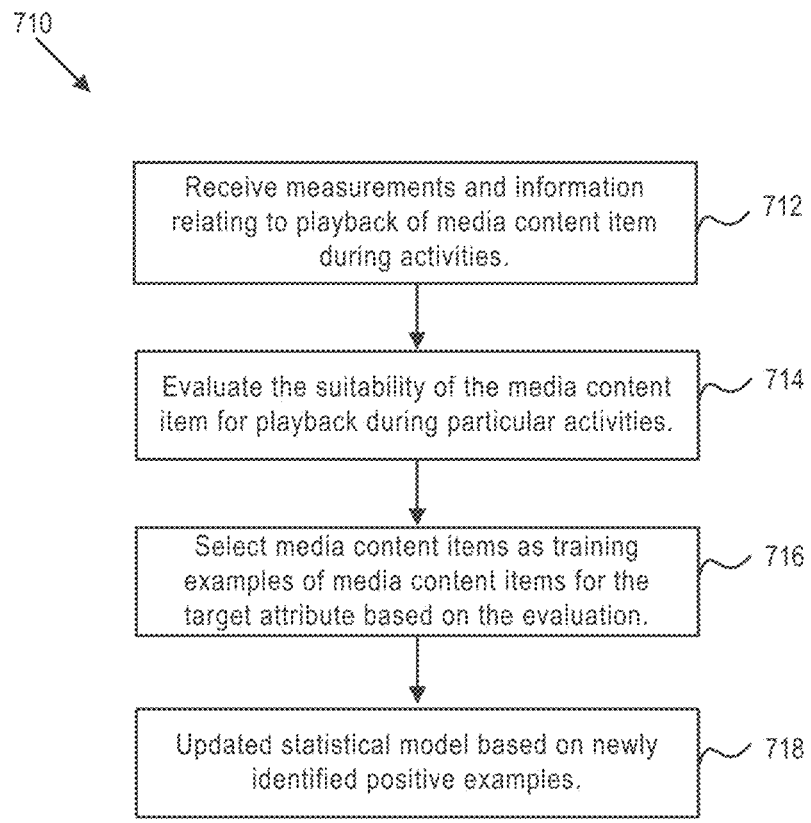
FIG. 17 illustrates an example method of analyzing the playback of media content items during activities that is performed by some embodiments of the refinement analysis engine of FIG. 2.

FIG. 17 illustrates an example method 710 of analyzing the playback of media content items during activities that is performed by some embodiments of the refinement engine 248. In some embodiments, the refinement engine 248 includes a content playback analysis engine that operates to perform the method 710. Although the method 710 is described in terms of running and runnability scores, the method 710 is also applicable to other activities and indirect qualities. Such a method can be used, for example, to identify media content items as being suitable for playback during certain activities or in certain environments based on analyzing the playback of the media content items during those activities or in those environments. The method 710 can, for example, be used to identify media content items that have positive effects on those activities or environments. The method 710 can also be used to identify media content items that have negative effects on those activities or environments. In some embodiments, the media content items having a positive effect are identified as positive examples for use in building or updating a model as illustrated and described with respect to at least FIGS. 12 and 13. Additionally, in some embodiments, the scores of media content items that are identified as having a strong positive or negative effect are updated by the method 710.

At operation 712, measurements related to running (or another activity or environment) while a particular media content item is being played back are received. In various embodiments, various measurements are received. In some embodiments, some or all of the measurements are captured by the media-playback device and transmitted to the media-delivery system 104. Example measurements include cadence, pace, cadence phase alignment to the media content item, and various physiological measurements.

Examples of calculating cadence phase alignment to the media content item are provided in U.S. Patent Application Ser. Nos. 62/163,856 and 14/883,318, titled CADENCE AND MEDIA CONTENT PHASE ALIGNMENT, and were filed on May 19, 2015 and Oct. 14, 2015, respectively, the entireties of which are hereby incorporated by reference. Examples of capturing and using physiological measurements are provided in U.S. Patent Application Ser. Nos. 62/163,915 and 14/883,245, titled HEART RATE CONTROL BASED UPON MEDIA CONTENT SELECTION, filed on May 19, 2015 and Oct. 14, 2015, respectively, the entireties of which are hereby incorporated by reference. In some embodiments, pace is calculated from cadence with an estimated or calibrated stride length. Additionally, pace can be calculated using the location-determining device 150.

Furthermore, in some embodiments the received measurements relate to a single user. Additionally, in some embodiments, the received measurements relate to multiple users and are received from multiple media-playback devices. In some embodiment, the measurements are received and captured for a time period (e.g., a week, a month, two months, three months, six months, etc.).

At operation 714, the suitability of the media content items for playback during running (or another activity or environment) is evaluated based on the received measurements. In some embodiments, a score is generated that corresponds to the suitability of a particular media content item for playback during running. In some embodiments, the suitability of a media content item is calculated based on comparing the captured measurements to target value for the parameter being measured. For example, if the user has indicated a desire to run with a cadence of 180 steps per minute, media content items that were played back while measurements of cadence that are close to 180 steps per minute were captured may be considered to positively affect the repetitive-motion activity. In some embodiments, the media content items are compared to one another to determine which media content items have a greater positive effect on the activity or environment. Beneficially, this comparative evaluation can be helpful to differentiate the effect of the media content item from the user's underlying performance or ability. Additionally, in some embodiments, media content items are evaluated based in part on calculating a metric related to how much the measurements change during playback of the media content item (e.g., standard deviation or variance). Further, in some embodiments, the media content items are evaluated based on whether users indicate liking a media content item (e.g., by actuating a like or favorite control) or disliking the media content item (e.g., by actuating a dislike control or skipping the media content item) when it is played during the activity or in the environment.

At operation 716, at least some of the media content items for which measurements were received are identified as positive examples of the indirect quality. In some embodiments, the media content items are compared to a predetermined threshold for a suitability score. Additionally, in some embodiments, a predetermined number of the highest scoring media content items are selected as positive examples. The newly selected positive examples may be included with other previously selected positive examples or may be used to replace the previously selected positive examples.

At operation 718, the statistical model may be updated based on the newly identified training examples. The statistical model may be retrained using a new corpus of training examples that includes the training examples identified in operation 714.

Additionally scores for the particular media content items for which measurements were received may be updated based on whether it was determined that the media content item has a positive or negative effect on the activity or environment. For example, the score associated with a particular indirect quality (e.g., runnability) for a particular media content item is increased if it is determined that the media content item has a positive effect on an associated activity or environment (e.g., running). Conversely, the score for a particular media content item is decreased if it is determined that the media content item has a negative effect on the activity or environment.

Figure 18:
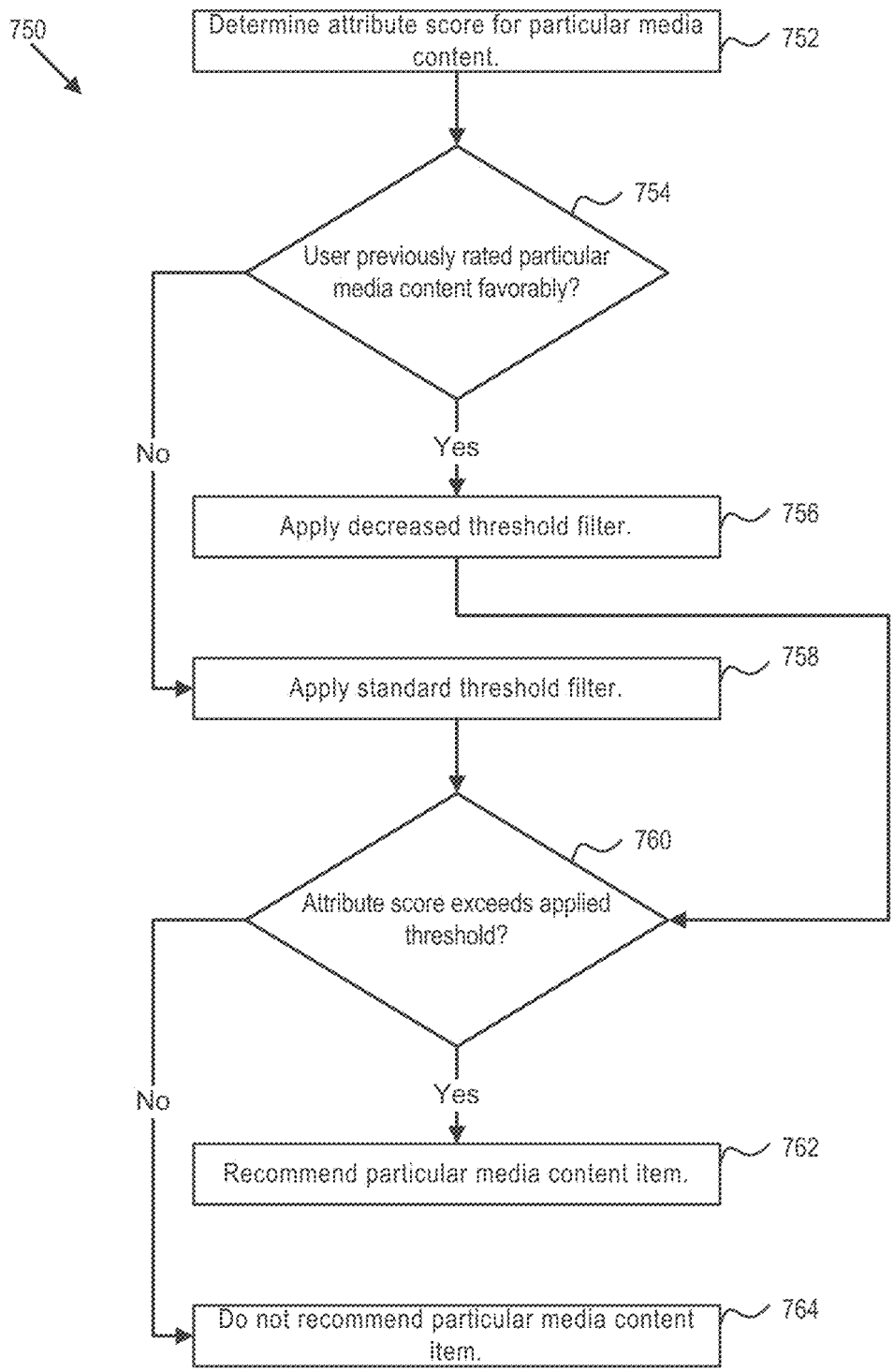
FIG. 18 illustrates an example method of searching for and filtering media content items based on a score associated with an indirect quality that is performed by some embodiments of the search control engine of FIG. 1.

FIG. 18 illustrates an example method 750 of searching for and filtering media content items based on a score associated with an indirect quality that is performed by some embodiments of the search control engine 168. Such a method can be used, for example, to identify media content items suitable for playback to a particular user during a particular activity or in a particular environment. Additional details on searching for and filtering media content is provided in U.S. Patent Application Ser. Nos. 62/163,927 and 14/883,295, titled SEARCH MEDIA CONTENT BASED UPON TEMPO, filed on May 19, 2015 and Oct. 14, 2015, respectively, the entireties of which are hereby incorporated by reference.

At step 752, the score for a particular media content item is determined. This can be accomplished using the processes described above. Alternatively, the score may be stored as part of the metadata associated with the media content item.

Next, at step 754, a determination is made regarding whether or not the user previously rated the particular media content item. For example, the user U can rate a particular media content item as one the user likes or dislikes. If the user has previously liked the particular media content item, control is passed to step 756, and a decreased threshold filter is used. Otherwise, control is passed to step 758, and a standard filter threshold is used.

For example, if the user has previously "liked" the particular media content item, the decreased threshold filter may require that the score for the media content item be at least 0.4. Alternatively, if the media content item has not been previously rated, the standard threshold filter may require that the score for the media content item be at least 0.6. In this manner, media content items that were previously marked as "liked" are favored.

Next, at step 760, the relevant filter (i.e., decreased or standard threshold) is applied. If the media content item exceeds the threshold of the applied filter, control is passed to step 762, and the media content item is recommended to the user. Otherwise, control is passed to step 764, and the media content item is not recommended.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following disclosure.

What is claimed is:

1. A media-delivery system comprising:
    a processing device;
    a media data store for storing a plurality of media content items; and
    a non-transitory computer-readable medium storing instructions executable by the processing device to cause the media-delivery system to:

automatically identify media content items from the plurality of media content items for use as potential training examples, to present for evaluation regarding an indirect quality, by processing descriptive data associated with the plurality of media content items to identify keywords associated with the indirect quality;

send messages to present the identified media content items including a first media content item and a second media content item;

receive indirect quality scores relating to the indirect quality wherein to receive the indirect quality scores includes to receive comparative assessment inputs identifying which of the first media content item and the second media content item has more of the indirect quality;

combine the indirect quality scores to generate combined indirect quality scores regarding the indirect quality for the identified media content items, and select training examples from the identified media content items based on the combined indirect quality scores.

2. The media-delivery system of claim 1, wherein the indirect quality is a quality that cannot be directly measured from a recording associated with a media content item.

3. The media-delivery system of claim 2, wherein the indirect quality is selected from a group of indirect qualities comprising:
   acousticness;
   liveness;
   runnability; and
   danceability.

4. The media-delivery system of claim 1, wherein the instructions are further executable to:
   apply a model associated with the indirect quality to the plurality of media content items to generate predicted indirect quality scores for the plurality of media content items, wherein the model comprises a statistical model built from the selected training examples using a machine learning technique.

5. The media-delivery system of claim 4, further comprising:
   a model data store for storing models for predicting indirect qualities in a media content item.

6. The media-delivery system of claim 5, wherein the instructions are further executable to:
   update the model based on the training examples; and
   store the updated model in the model data store.

7. The media-delivery system of claim 6, wherein the machine learning technique is selected from a group of machine learning techniques comprising:
   variational Bayes Gaussian mixture models;
   support vector machines;
   artificial neural networks;
   k-means clustering;
   logistic regression;
   latent dirichlet allocation; and
   spectral hashing.

8. The media-delivery system of claim 6, wherein the model further comprises a probabilistic graphical model, wherein the probabilistic graphical model includes joint probabilities based on prior knowledge about the media content item and output of the statistical model.

9. The media-delivery system of claim 8, wherein the prior knowledge comprises a genre associated with the media content item.

10. The media-delivery system of claim 4, wherein the instructions are further executable to:

filter the plurality of media content items based on metadata associated with the plurality of media content items to generate a plurality of filtered media content items; and present at least a portion of the plurality of filtered media content items, wherein the portion of the plurality of filtered media content items presented are selected based on the indirect quality scores.

11. The media-delivery system of claim 1, wherein the instructions are further executable to:
   combine a plurality of selections of the comparative assessment inputs to rank a plurality of the potential training examples by the combined indirect quality scores.

12. The media-delivery system of claim 11, wherein the ranking is calculated by combining a plurality of pairwise scores corresponding to the potential training examples to order the potential training examples by their combined pairwise score.

13. A method comprising:
   identifying a first media content item and a second media content item from a plurality of media content items for use as potential training examples, to present for evaluation regarding an indirect quality, by processing descriptive data associated with the plurality of media content items to identify keywords associated with the indirect quality;

causing a media playback device to present a user-interface to comparatively evaluate the first media content item and the second media content item with respect to the indirect quality, wherein the user-interface includes:
   one or more user-actuatable controls configured to obtain a comparative assessment input identifying which of the first media content item and the second media content item has more of the indirect quality; and receiving indirect quality scores relating to the indirect quality, wherein to receive the indirect quality scores includes to receive comparative assessment inputs identifying which of the first media content item and the second media content item has more of the indirect quality;

sending the indirect quality scores to at least one server to combine the indirect quality scores to generate combined indirect quality scores regarding the indirect quality for the identified media content items;

selecting training examples from the identified media content items based on the combined indirect quality scores.

14. The method of claim 13, wherein the one or more user-actuatable controls include:
   a first user-actuatable control configured to receive a first input indicating that the first media content item is more strongly associated with the indirect quality than the second media content item; and
   a second user-actuatable control configured to receive a second input indicating that the second media content item is more strongly associated with the indirect quality than the first media content item.

15. The method of claim 13, wherein the user-interface further includes:
   a textual display region including a textual prompt related to the indirect quality.

16. The method of claim 13, further comprising:
   prior to causing the media playback device to present the user-interface, automatically identifying media content items that appear related to the indirect quality.

17. The method of claim 13, further comprising:
building a statistical model related to the indirect quality using the selected training examples and a machine learning technique; and
evaluating media content items by applying the statistical model associated with the indirect quality to a plurality of media content items to generate predicted indirect quality scores for the plurality of media content items, the predicted indirect quality scores being a numeric value that corresponds to how strongly the media content item embodies the indirect quality as determined by the statistical model.

18. The method of claim 17, further comprising:
selecting the first training example and not the second training example for use as one of the training examples for the statistical model based on the received comparative assessment input.

19. The method of claim 17, further comprising:
evaluating media content items using the statistical model;
filtering the evaluated media content items; and
presenting the filtered evaluated media content items.

20. One or more non-transitory computer-readable storage devices storing data instructions, which when executed by at least one processing device of a system for media content selection, cause the system to:
automatically identify media content items from a plurality of media content items for use as potential training examples, to present for evaluation regarding an indirect quality, by processing descriptive data associated with the plurality of media content items to identify keywords associated with the indirect quality;
present the identified media content items for scoring, wherein to present the identified media content items includes to:
present a first media content item, a second media content item, and at least one user-actuatable control configured to obtain a comparative assessment input identifying which of the first media content item and the second media content item has more of the indirect quality;
receive indirect quality scores relating to the indirect quality, wherein to receive the indirect quality scores includes to receive comparative assessment inputs identifying which of the first media content item and the second media content item has more of the indirect quality;
combine the indirect quality scores to generate combined indirect quality scores regarding the indirect quality for the identified media content items; and
select training examples from the identified media content items based on the combined indirect quality scores.

* * * * *